(12) United States Patent
Kosugi et al.

(10) Patent No.: US 7,909,919 B2
(45) Date of Patent: Mar. 22, 2011

(54) VAPORIZED FUEL TREATMENT APPARATUS

(75) Inventors: Ryuji Kosugi, Obu (JP); Kazusato Kasuya, Kariya (JP); Masamitsu Hayakawa, Anjyo (JP); Shota Yamanaka, Hekinan (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 192 days.

(21) Appl. No.: 12/396,530

(22) Filed: Mar. 3, 2009

(65) Prior Publication Data

US 2009/0223370 A1 Sep. 10, 2009

(30) Foreign Application Priority Data

Mar. 10, 2008 (JP) ................................. 2008-059423
Mar. 19, 2008 (JP) ................................. 2008-070754

(51) Int. Cl.
  *F02M 25/08* (2006.01)
  *B01D 53/04* (2006.01)
(52) U.S. Cl. ................ 96/126; 96/131; 55/498; 55/502; 123/519
(58) Field of Classification Search ........... 95/146; 96/121, 126, 131, 132, 147, 149; 55/490, 55/498, 502; 123/518–520
See application file for complete search history.

(56) References Cited

U.S. PATENT DOCUMENTS

| | | | | |
|---|---|---|---|---|
| 4,386,947 A | * | 6/1983 | Mizuno et al. | ............. 96/137 |
| 4,444,721 A | * | 4/1984 | Ohkata | ............. 422/179 |
| 5,861,050 A | | 1/1999 | Pittel et al. | |
| 6,695,896 B2 | * | 2/2004 | Hara et al. | ............. 96/121 |
| 6,814,771 B2 | * | 11/2004 | Scardino et al. | ............. 55/385.3 |
| 7,118,716 B2 | * | 10/2006 | Meiller et al. | ............. 422/180 |
| 7,159,579 B2 | * | 1/2007 | Meiller et al. | ............. 123/518 |
| 7,378,060 B2 | * | 5/2008 | Sinha et al. | ............. 422/179 |
| 7,488,376 B2 | * | 2/2009 | Kim et al. | ............. 96/134 |
| 7,507,278 B2 | * | 3/2009 | Makino et al. | ............. 96/132 |
| 7,543,574 B2 | * | 6/2009 | Yamazaki et al. | ............. 123/519 |
| 7,670,412 B2 | * | 3/2010 | Kido et al. | ............. 96/147 |
| 7,841,321 B2 | * | 11/2010 | Kosugi et al. | ............. 123/519 |
| 2003/0145731 A1 | | 8/2003 | Biaso | |
| 2009/0266236 A1 | * | 10/2009 | Kosugi et al. | ............. 96/152 |

FOREIGN PATENT DOCUMENTS

| | | |
|---|---|---|
| JP | 2003003914 | 1/2003 |
| JP | 2004100691 | 4/2004 |
| JP | 2006063859 | 3/2006 |
| JP | 2006211623 | 8/2006 |
| JP | 2006233962 | 9/2006 |

* cited by examiner

*Primary Examiner* — Frank M Lawrence
(74) *Attorney, Agent, or Firm* — Dennison, Schultz & MacDonald

(57) ABSTRACT

A vaporized fuel treatment apparatus having comprising a first adsorbent having a honeycomb structure capable of adsorbing and desorbing vapor contained in fuel evaporation gas, a case configured to house the first adsorbent therein, and a holding device configured to elastically hold the first adsorbent within the case. The first adsorbent has a circumferential surface and at least one end surface intersecting with the circumferential surface at a corner portion. The holding device comprises a holding member having a first portion and a second portion configured to contact with the circumferential surface and the at least one end surface, respectively. The holding member does not contact with the corner portion of the first adsorbent. The vaporized fuel treatment apparatus can include a sealed container disposed in a canister for controlling temperature alteration in the canister.

17 Claims, 20 Drawing Sheets

VAPORIZED FUEL TREATMENT APPARATUS

This application claims priority to Japanese patent application serial numbers 2008-059423 and 2008-070754, the contents of which are incorporated herein by reference.

BACKGROUND OF THE INVENTION

The present invention relates to vaporized fuel treatment apparatuses that are mainly adapted to be mounted on vehicles.

One example of known vaporized fuel treatment apparatuses will be described. FIG. 31 shows a cross sectional view of one of the vaporized fuel treatment apparatus.

As shown in FIG. 31, a vaporized fuel treatment apparatus 201 has a molded adsorbent 202 with a honeycomb structure capable of adsorbing and desorbing vapor contained in a fuel evaporation gas, a case 203 for housing the molded adsorbent 202, and a pair of holding members 204 and 205 for elastically holding the molded adsorbent 202 in the case 203. The holding member 204 disposed on a front side (right side in FIG. 31) of the molded adsorbent 202 with respect to an insertion direction of the molded adsorbent 202 is formed in a ring shape and includes a circumference surface holding portion 204a engaging with an outer circumference surface of the molded adsorbent 202, and an end surface holding portion 204b engaging with an end surface of the molded adsorbent 202. On the other hand, the holding member 205 disposed on the other side (left side in FIG. 31) of the molded adsorbent 202 with respect to the insertion direction is formed in a ring shape for engaging with the outer circumference surface of the molded adsorbent 202. In addition, a filter 206 made of a non-woven cloth is disposed to oppose to the second surface of the molded adsorbent 202 (left surface in FIG. 31) in order to entirely cover the second surface. This type of vaporized fuel treatment apparatus is disclosed, for example, in Japanese Laid-Open Patent Publication No. 2004-100691 (see paragraph [0082] and FIG. 17).

The molded adsorbent 202 generally has a low mechanical intensity, and especially a shoulder portion 202a formed between the outer circumference surface and the first end surface with respect to an axial direction (the insertion direction) (hereinafter simply referred to as "front end surface") is weak and fragile. Therefore, when the holding member 204 having the circumference surface 204a contacting with the outer circumference surface of the molded adsorbent 202 and the end surface holding portion 204b contacting with the end surface of the molded adsorbent 202 is used, there has been a problem that the shoulder portion 202a of the molded adsorbent 202 may be damaged during the mounting operation of the holding member 204 on the molded adsorbent 202.

U.S. Pat. No. 5,861,050 discloses a vaporized fuel treatment apparatus including a canister filled with an adsorbent capable of adsorbing vapor generated in a fuel tank. A latent heat storage material is disposed with the canister for inhibiting change in temperature within the canister.

In this vaporized fuel treatment apparatus, the latent heat storage material utilizes latent heat that may be generated during solidification or melting for inhibiting change in temperature and is contained within a sealed container housed within the canister.

When the latent heat storage material absorbs heat and melts, the volume of the latent heat storage material generally increases, and thus a mechanism for compensating the volume increase of the latent heat storage material may be required. However, such a mechanism for compensating the volume increase of the latent heat storage material is not disclosed in U.S. Pat. No. 5,861,050.

BRIEF SUMMARY OF THE INVENTION

One aspect according to the present invention includes vaporized fuel treatment apparatuses having a first adsorbent having a honeycomb structure capable of adsorbing and desorbing vapor contained in fuel evaporation gas, a case configured to house the molded adsorbent therein, and a holding device configured to elastically hold the molded adsorbent within the case. The molded adsorbent has a circumferential surface and at least one end surface intersecting with the circumferential surface at a corner portion. The holding device includes a holding member having a first portion and a second portion configured to contact with the circumferential surface and the at least one end surface, respectively. The holding member does not contact with the corner portion of the molded adsorbent.

In accordance with the present invention, since the first portion of the holding member engages with the circumference surface of the molded adsorbent whereas the second portion engages with the at least end surface of the molded adsorbent, the molded adsorbent can be elastically held in the case. In that state, the holding member does not contact with the corner portion of the molded adsorbent, and thus potential breakage of the corner portion of the molded adsorbent due to the holding member can be prevented or reduced.

Second aspect of the present invention includes vaporized fuel treatment apparatuses further including a canister filled with a particle adsorbent capable of adsorbing and desorbing the vapor, a heat storage material capable of inhibiting alteration in temperature within the canister by producing latent heat when the heat storage material is solidified or melted, and a sealed container containing the heat storage material therein and disposed within the canister. The sealed container includes a gas capable of compensating potential increase in volume of the heat storage material due to melting.

In accordance with the present invention, since the sealed container includes the gas for compensating the volume increase of the heat storage material. Therefore, for example, when the volume of the heat storage material increases during melting, the gas can be compressed in order to compensate the volume increase of the heat storage material, thereby avoiding to exert an excess stress on the sealed container.

In this specification, the term "molded adsorbent" means a formed permeable adsorbent having a honeycomb structure (also referred to as monolith) and made from a mixture of an activated carbon and a binder, and the term "adsorbent" generally means an adsorbent in, e.g., powder or particle form.

DETAILED DESCRIPTION OF THE INVENTION

Each of the additional features and teachings disclosed above and below may be utilized separately or in conjunction with other features and teachings to provide vaporized fuel treatment apparatuses. Representative examples of the present invention, which examples utilized many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
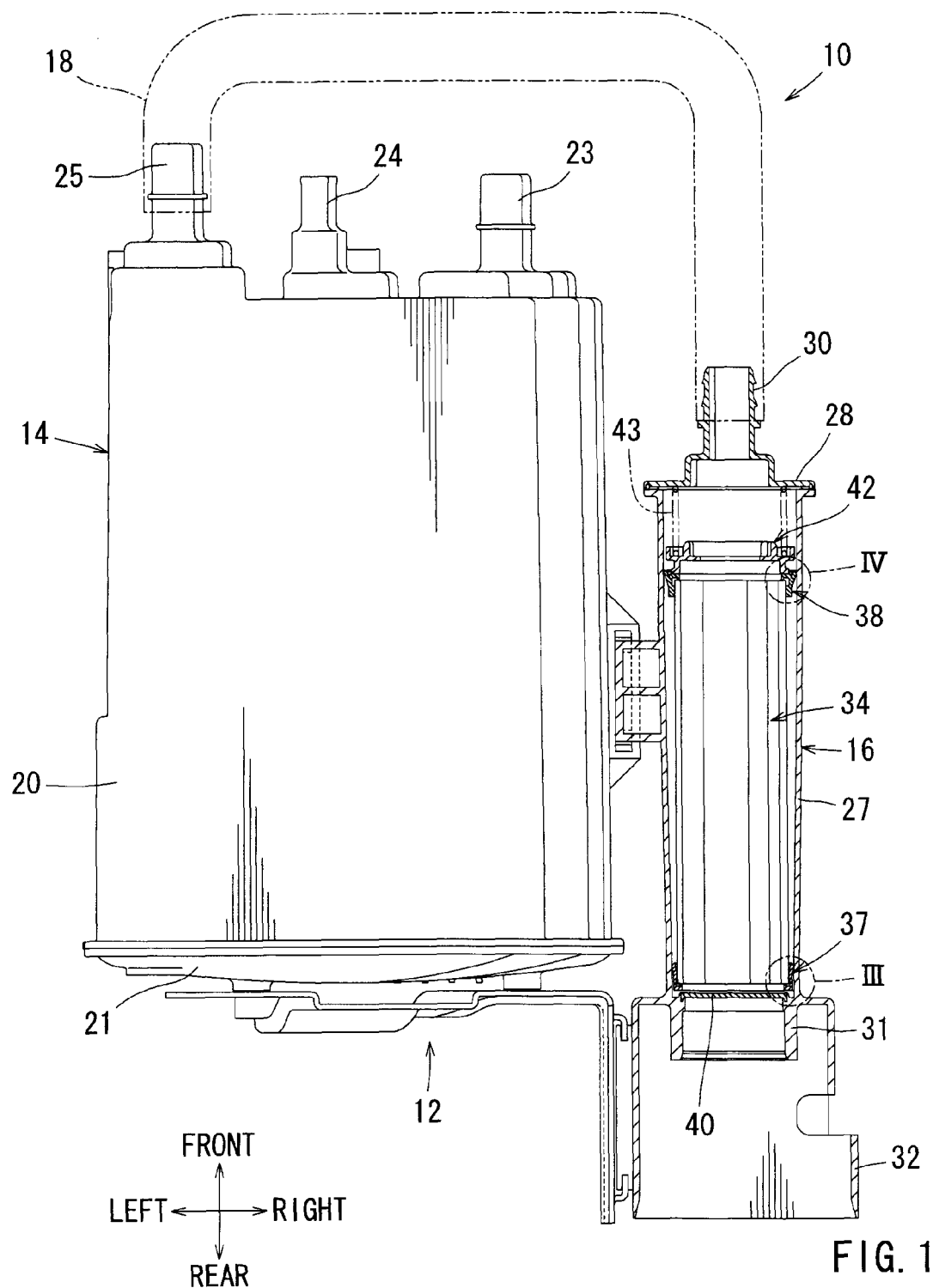
FIG. 1 is a plane view partly in section of a vaporized fuel treatment apparatus according to the first embodiment.

A vaporized fuel treatment apparatus according to a first embodiment will be described in reference to FIGS. 1-6. As shown in FIG. 1, a vaporized fuel treatment apparatus 10 includes a case assembly 12 that has a primary case 14, a secondary case 16 separated from the primary case 14 and a communication pipe 18 for communicating the primary case 14 with the secondary case 16. For the purpose of explanation, terms "front", "rear", "right" and "left" used in the following explanation are those as viewed in FIG. 1.

The primary case 14 has a hollow box shape. The primary case 14 has a case main body 20 with a closed top and an open bottom, and a lid plate 21 for closing the open bottom of the case main body 20. A tank port 23, a purge port 24 and a connection port 25 are disposed at a first portion of the primary case 14. The tank port 23 is connected with a fuel evaporation gas pathway (not shown) for communicating with a fuel tank (not shown). The fuel evaporation gas that may be generated in the fuel tank can be introduced into the primary case 14 via the fuel evaporation gas pathway and the tank port 23. The fuel evaporation gas may be a mixture of vaporized hydrocarbon compound (hereinafter simply referred to as "vapor") and air.

The purge port 24 is connected with a purge pathway (not shown) communicated with an intake air pipe of an engine (not shown). A purge control valve (not shown) is disposed in the purge pathway. During the operation of the engine, the purge control valve is regulated by a controller in order to carry out a purge control for desorption of the vapor. In addition, the connection port 25 is connected with one end of the communication pipe 18.

The primary case 14 is filled with a particle adsorbent (not shown). The adsorbent can adsorb the vapor contained in the fuel evaporation gas introduced into the primary case 14 from the tank port 23, and is made of granulated activated carbon, fractured activated carbon or the like.

The secondary case 16 has a cylindrical tubular portion 27 with a hollow cylindrical shape, and a lid portion 28 for closing a front opening of the cylindrical tubular portion 27. A connection port 30 communicating within the secondary case 16 is provided on the lid portion 28. The connection port 30 is connected with the other end of the communication pipe 18. Accordingly, the inner space of the primary case 14 and the inner space of the secondary case 16 are communicated with each other via the communication pipe 18. In addition, an atmospheric port 31 having a reduced open diameter is provided on a rear end portion of the secondary case 16. The atmospheric port 31 is connected with an atmospheric pathway (not shown) communicating with the atmosphere. In addition, a cylindrical tubular cover 32 for covering an outer circumference of the atmospheric port 31 is provided at a rear end of the secondary case 16. The secondary case 16 is attached to a side surface of the primary case 14. The cylindrical tubular portion 27 is formed in a gradually tapered shape such that an inner diameter of a front side close to the lid portion 21 is larger than that of an opposite side close to the atmospheric port 31.

Figure 2:
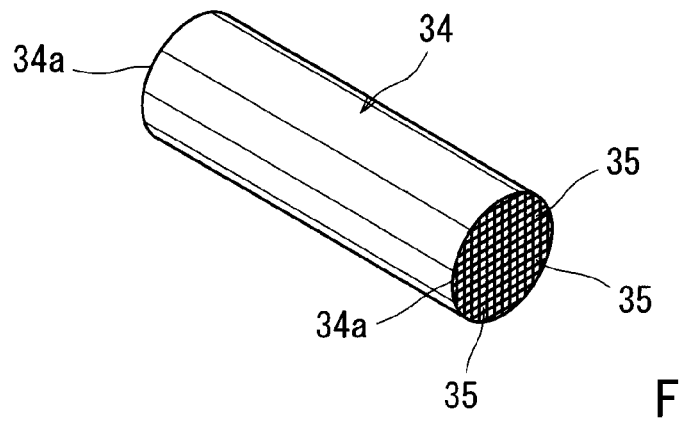
FIG. 2 is a perspective view of a molded adsorbent.

A molded adsorbent 34 with a honeycomb structure is housed in the cylindrical tubular portion 27 of the secondary case 16. FIG. 2 is a perspective view of the molded adsorbent 34.

As shown in FIG. 2, the molded adsorbent 34 has a cylindrical shape, and has a number of gas passage holes 35 extending in an axial direction of the molded adsorbent 34 (in the longitudinal direction in FIG. 1). When the fuel evaporation gas passes through the gas passage holes 35, the molded adsorbent 34 can adsorb the vapor contained in the fuel evaporation gas. Corner portions formed between an outer circumference surface and opposite end surfaces of the molded adsorbent 34 will be referred to as shoulder portions 34a. The molded adsorbent 34 may be made by the process of mixing a material having a high heat capacity, such as ceramic material, an adsorbent, such as activated carbon, and a binder at a predetermined ratio, molding the mixture into a predetermined shape, such as a cylinder shape, and then sintering the molded mixture.

As shown in FIG. 1, the molded adsorbent 34 is resiliently held between a pair of first and second holding members 37 and 38 within the cylindrical tubular portion 27 of the secondary case 16. The first holding member 37 is close to or in contact with a gas permeable filter 40 disposed on a front end portion of the atmospheric port 31. A ring-shaped pressing member 42 is concentrically placed on the second holding member 38. In addition, after concentrically placing a press spring 43 composed of a coil spring on the pressing member 42, the lid portion 28 is attached to the front opening of the cylindrical tubular portion 27 by welding or adhering. The press spring 43 resiliently applies a pressing force against the molded adsorbent 34.

In operation, the fuel evaporation gas generated in the fuel tank may be introduced into the primary case 14 via the tank port 23. The fuel evaporation gas flows through clearances between the adsorbent particles housed in the primary case 14, and then flows into the secondary case 16 through the connection port 25, the communication pipe 18 and the connection port 30. The fuel evaporation gas flows through the gas passage holes 35 of the molded adsorbent 34 (shown in FIG. 2), and is then discharged into the atmosphere through the atmospheric port 31. During these processes, the adsorbent in the primary case 14 adsorbs the vapor in the fuel evaporation gas, and the molded adsorbent 34 in the secondary case 16 adsorbs the rest of the vapor in the fuel evaporation gas. As a result, the gas that does not substantially contain the fuel component is discharged from the atmospheric port 31.

On the other hand, due to the purge control during the engine operation, when the purge control valve is opened by the operation of the controller (not shown), the air outside is drawn into the secondary case 16 through the atmospheric port 31 of the secondary case 16 since a negative pressure within the intake air pipe is introduced into the primary case 14 through the purge port 24. Therefore, the air is purged into the intake air pipe as it flows through the gas passage holes 35 of the molded adsorbent 34, the communication pipe 18, the clearances between the adsorbent particles contained within the primary case 14, and the purge port 24. During this process, the vapor is desorbed from the adsorbent particles and the molded adsorbent 34 and introduced into the air intake pipe.

Next, the holding structure for the molded adsorbent 34 according to the vaporized fuel treatment apparatus 10 will be described. Since the first and second holding members 37 and 38 have the substantially same structure, only the first holding member 37 will be described, and differences of the holding member 38 from the holding member 37 will be additionally described. As for the holding member 38, the same or substantially same portions as the first holding member 37 are labeled with the same reference numbers as the first holding member 37.

Figure 5:
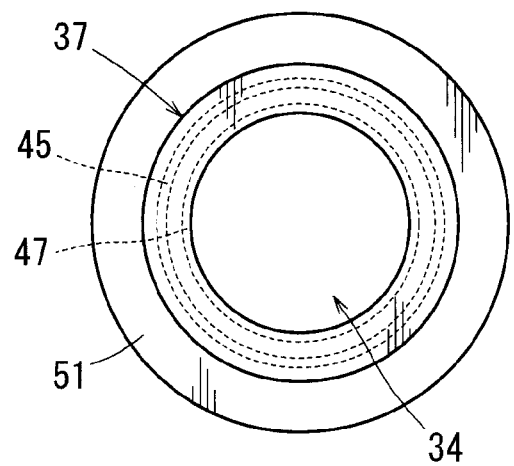
FIG. 5 is an end view of a molded adsorbent provided with a first holding member.
Figure 6:
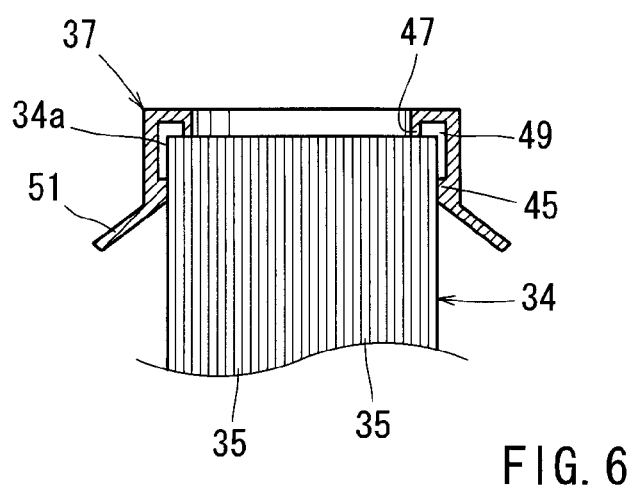
FIG. 6 is a side cross sectional view of a main portion of the molded adsorbent provided with the first holding member.

As shown in FIG. 5, the first holding member 37 is formed in a ring shape from an elastic material. In addition, as shown in FIG. 6, the first holding member 37 is configured to have a substantially L-shaped cross section and has a circumference surface holding portion 45 for engaging with an outer circumferential surface of the molded adsorbent 34 and an end surface holding portion 47 for engaging with an end surface of the molded adsorbent 34. A relief recess 49 is formed in an inner circumferential portion of the holding member 37 and has an L-shape cross section so as to oppose to the shoulder portion 34a of the molded adsorbent 34 when the holding member 37 is attached to the molded adsorbent 34. The relief recess 49 is continuously formed over the whole circumference of the holding member 38. A lip sealing portion 51 with a tapered cylindrical shape is formed on a free end portion of the circumference surface holding portion 45 (rear end in FIG. 6). The outer diameter of the lip sealing portion 51 increases in an opposite direction to the insertion direction of the molded adsorbent 34 (the opposite direction being forward in FIG. 3 or rearward in FIG. 6). The first holding member 37 is made from a gas impermeable elastic material.

Figure 3:
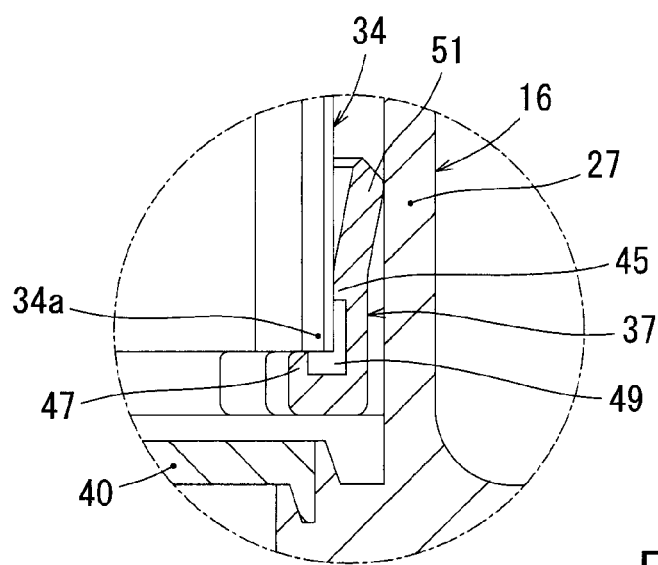
FIG. 3 is an enlarged cross sectional view of portion III in FIG. 1.
Figure 4:
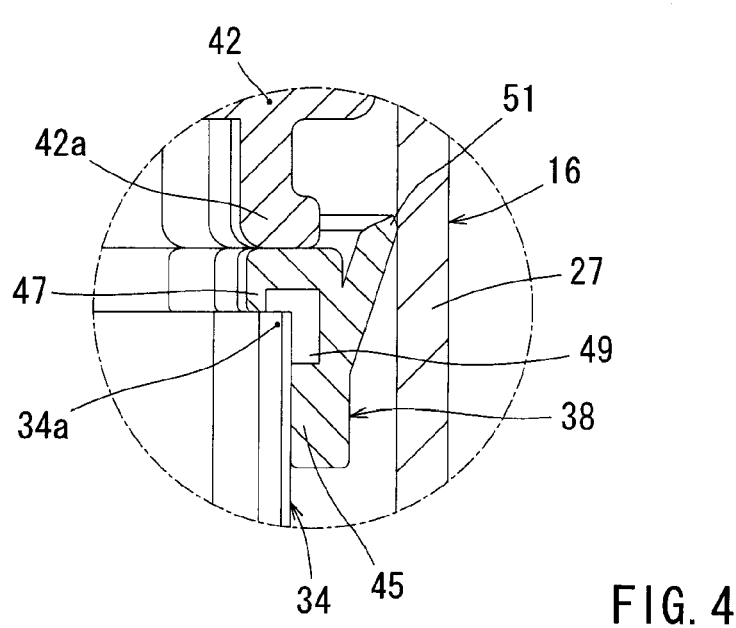
FIG. 4 is an enlarged cross sectional view of portion IV in FIG. 1.

The first and second holding members 37 and 38 are symmetrically positioned with respect to the molded adsorbent 34 (refer to FIGS. 3 and 4). In addition, a lip sealing portion 51 of the second holding member 38 is formed on an outer circumferential surface of the circumference surface holding portion 45 and has a tapered shape, in which the outer diameter increases toward the direction opposite to the insertion direction of the molded adsorbent 34.

Prior to the inserting operation of the molded adsorbent 34 into the cylindrical tubular portion 27 of the secondary case 16, the first holding member 37 is resiliently fitted to a first end (a rear end in FIG. 1) of the molded adsorbent 34 (refer to FIGS. 3, 5 and 6). In addition, the second holding member 38 is resiliently fitted to a second end (a front end in FIG. 1) of the molded adsorbent 34 (refer to FIG. 4).

The molded adsorbent 34 having the holding members 37 and 38 attached thereto are then inserted into the cylindrical tubular portion 27 of the secondary case 16 before attachment of the lid portion 28. Therefore, as shown in FIG. 3, a large diameter-side end of the lip sealing portion 51 of the first holding member 37 resiliently contacts with the inner circumferential surface of the cylindrical tubular portion 27 while a clearance exists between the outer circumferential surface of the circumference surface holding portion 45 of the first holding member 37 and the inner circumferential surface of the cylindrical tubular portion 27. In addition, as shown in FIG. 4, a large diameter-side end of the lip sealing portion 51 of the second holding member 38 resiliently contacts with the inner circumferential surface of the cylindrical tubular portion 27 while a clearance exists between an outer circumferential surface of the circumference surface holding portion 45 of the second holding member 38 and the inner circumferential surface of the cylindrical tubular portion 27. As a result, the molded adsorbent 34 is resiliently held within the cylindrical tubular portion 27 by the first and second holding members 37 and 38. The first and second holding members 37 and 38 can elastically seal a space defined between the cylindrical tubular portion 27 and the molded adsorbent 34. The end surface holding portion 47 of the first holding member 37 is close to or in contact with the filter 40 (refer to FIG. 3). In addition, a ring-shaped pressing portion 42a formed on the pressing member 42 bears against the end surface holding portion 47 of the second holding member 38 (refer to FIG. 4).

According to the vaporized fuel treatment apparatus 10, the circumference surface holding portions 45 of the first and second holding members 37 and 38 can engage with the outer circumferential surface of the molded adsorbent 34. In addition, the end surface holding portions 47 of the holding members 37 and 38 can engage with the opposite end surfaces of the molded adsorbent 34. Therefore, the molded adsorbent 34 can be resiliently held within the case assembly 12 (in particular, within the secondary case 16). Since the relief recesses 49 are formed on the first and second holding members 37 and 38 and are opposed to the shoulder portions 34a formed between the outer circumference surface and the opposite end surfaces of the molded adsorbent 34, it is possible to avoid contact of the shoulder portions 34a with the holding members 37 and 38. Accordingly, potential damage of the shoulder portions 34a of the molded adsorbent 34 due to contact with the holding members 37 and 38 can be prevented or reduced. In an alternative embodiment, the vaporized fuel treatment apparatus 10 may be composed of only the secondary case 16 having the molded adsorbent 34 without the primary case 14 and the communication pipe 18.

Second to eighth embodiments will now be described with reference to FIGS. 7 to 25. These embodiments are modifications of the first embodiment. Therefore, in FIGS. 7 to 25, like members are given the same reference numbers as the first embodiment, and the description of these members will not be repeated.

Figure 7:
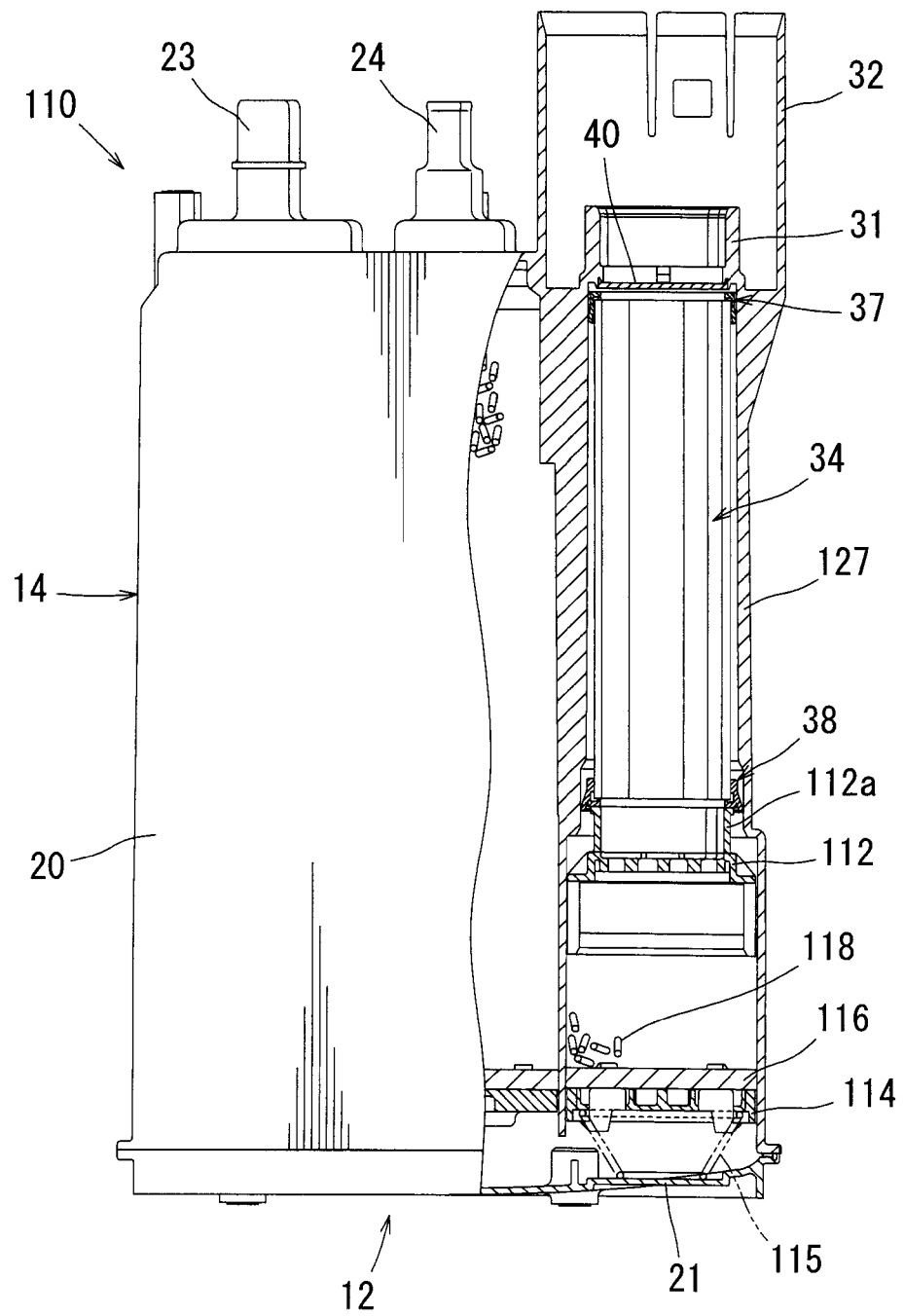
FIG. 7 is a plane view in partly in section of a vaporized fuel treatment apparatus according to the second embodiment.

A second embodiment will be described with reference to FIG. 7. A vaporized fuel treatment apparatus 110 of this embodiment does not include the secondary case 16 and the communication pipe 18. In addition, a cylindrical tubular portion 127 having the same structure as the cylindrical tubular portion 27 of the first embodiment is formed on a side portion of the case main body 20 of the primary case 14. The atmospheric port 31 and the cylindrical tubular cover 32 are oriented to be positioned on the front side of the case main body 20, and an open side end portion (a rear end portion in FIG. 7) of the cylindrical tubular portion 127 has an opening that is spaced away from the lid plate 21 by a predetermined distance. Therefore, the cylindrical tubular portion 127 is communicated with the inner space of the case main body 20 through a clearance near the lid plate 21.

A perforated pressing member 112 is provided within a portion adjacent the rear side of the center portion of the cylindrical tubular portion 127 instead of the pressing member 42 of the first embodiment. Similar to the pressing member 42, the pressing member 112 has a ring-shaped pressing member 112a for bearing against the end surface holding portion 47 of the second holding member 38 (refer to FIG. 4).

A gas permeable press plate 114 is perpendicularly fitted within a rear opening of the cylindrical tubular portion 127 such that it can move in a horizontal direction within the rear opening. A pressing spring 115 composed of a coil spring and resiliently pressing the press plate 114 forwardly is disposed between the press plate 114 and the lid plate 21. A space defined between the pressing member 112 and the press plate 114 is filled with particle adsorbent 118 made of activated carbon. In addition, a gas permeable filter 116 is laid on the press plate 114.

Figure 8:
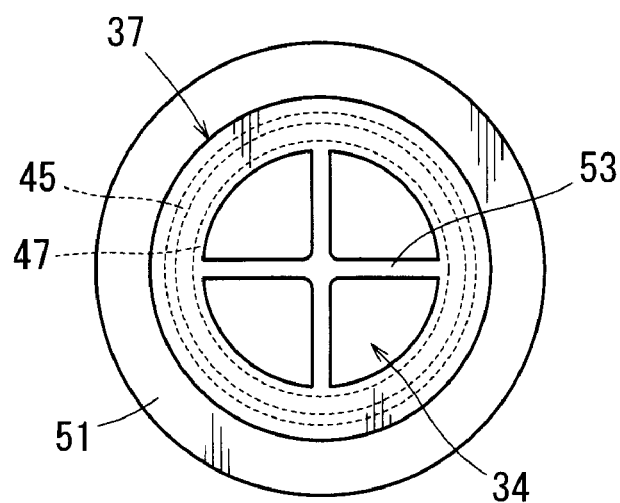
FIG. 8 is an end view of a molded adsorbent provided with a first holding member according to the third embodiment.
Figure 9:
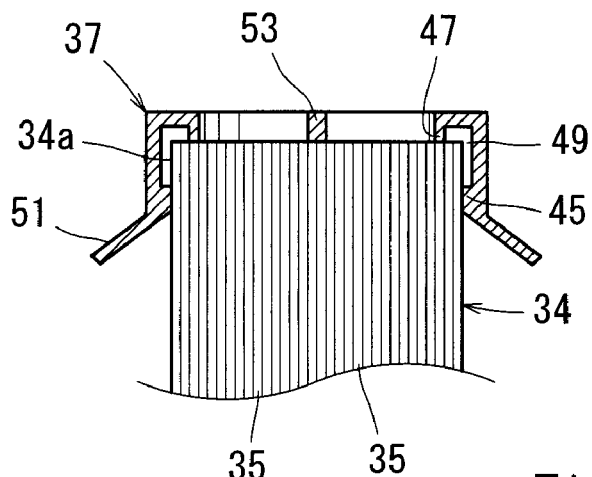
FIG. 9 is a side cross sectional view of a main portion of the molded adsorbent provided with the first holding member.
Figure 10:
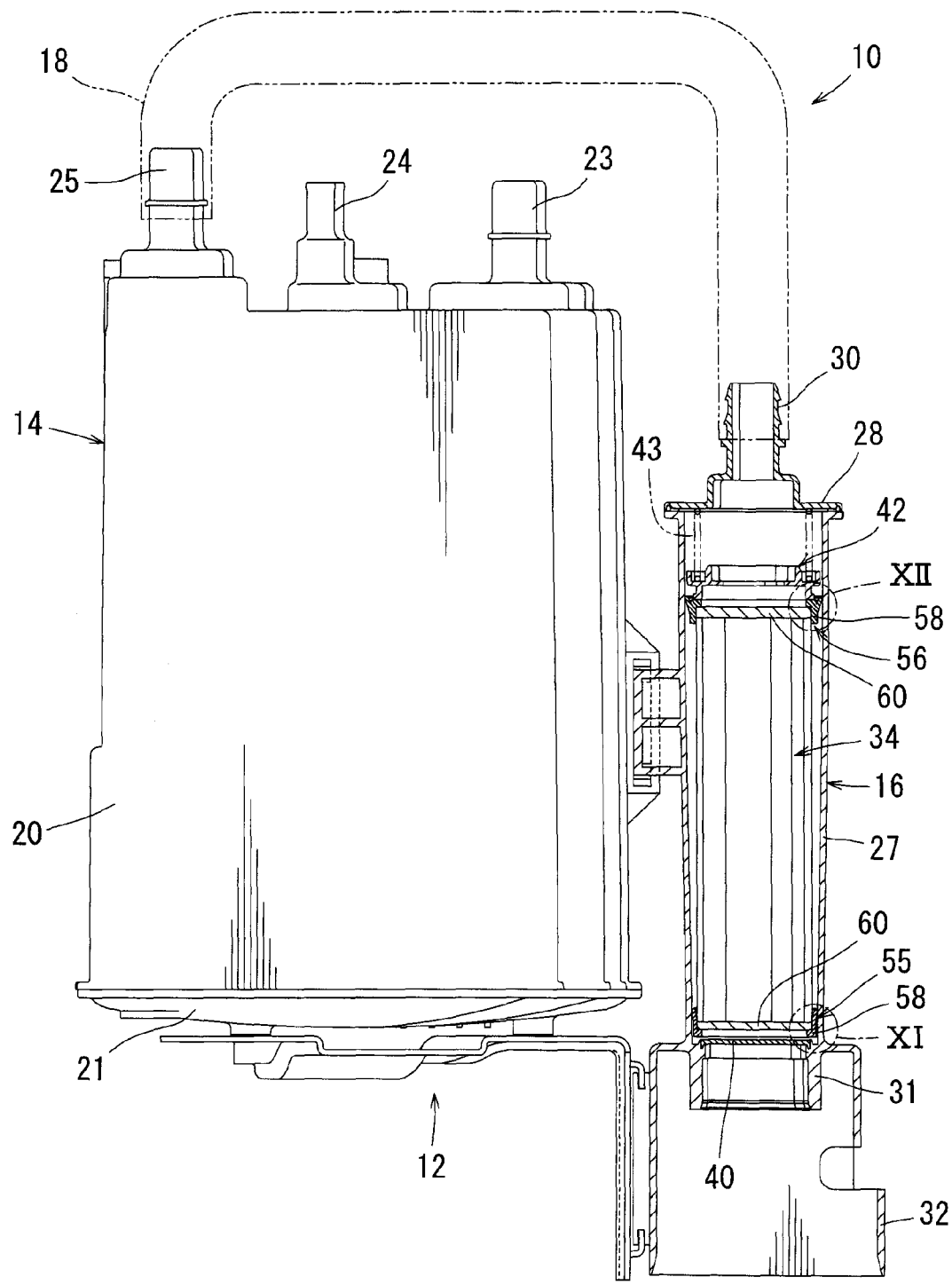
FIG. 10 is a plane view partly in section of a vaporized fuel treatment apparatus according to the fourth embodiment.

A third embodiment will now be described with reference to FIGS. 8 and 9. According to the third embodiment, a cross-shape rib portion 53 is formed on the end surface holding portion 47 of the first holding member 37 in order to reinforce the end surface holding portion 47. Other than the cross shape, the rib portion 53 can be formed in various shapes, such as a straight shape, a three spoke shape or a mesh-like shape, as long as the end surface holding portion 47 can be reinforced. A reinforcing structure like the rib portion 53 can also be applied to the end surface holding portion 47 of the second holding member 38.

A fourth embodiment will now be described with reference to FIGS. 10-14. In accordance with the fourth embodiment, the holding structure for the molded adsorbent 34 of the first embodiment is modified. For the purpose of explanation, a holding member 55 and a holding member 56 positioned on the rear side and the front side in FIG. 10 will be referred to as a first holding member 55 and a second holding member 56, respectively. In addition, since the first holding member 55 and the second holding member 56 have substantially the same configuration, only the first holding member 55 will be described, and differences of the second holding member 56 from the first holding member 55 will be described additionally. In FIGS. 10-14, components of the second holding member 56 that are the same or similar to components of the first holding member 56 are labeled with the same reference numbers as the first holding member 56.

Figure 13:
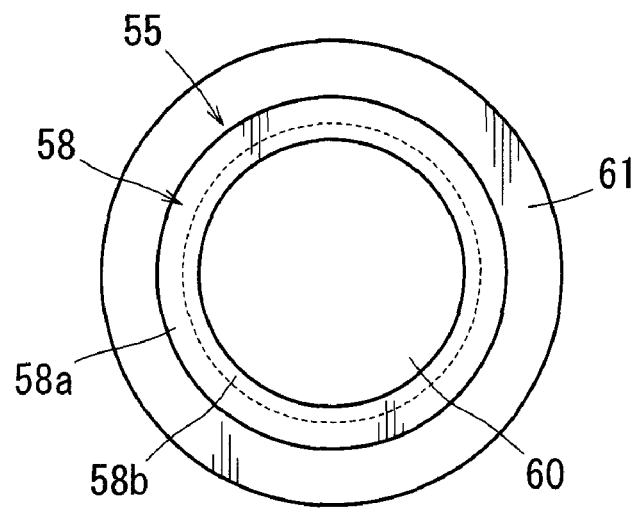
FIG. 13 is an end view of a molded adsorbent provided with the first holding member.
Figure 14:
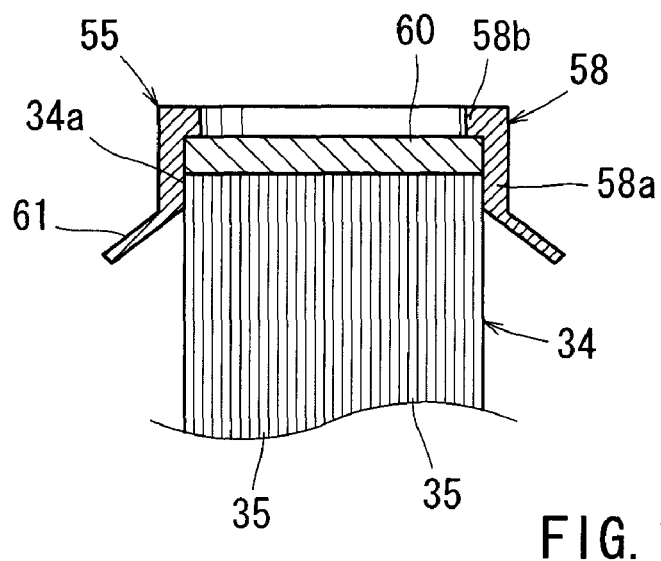
FIG. 14 is a side cross sectional view of a main portion of the molded adsorbent provided with the first holding member.

As shown in FIGS. 13 and 14, the first holding member 55 of this embodiment has a circumference surface holding member 58 for engaging with the outer circumference surface of the molded adsorbent 34 and an end surface holding member 60 adapted to be held in contact with the end surface of the molded adsorbent 34. The circumference surface holding member 58 is made from a gas impermeable elastic material. The end surface holding member 60 is made from a gas permeable elastic material, such as urethane form, and has a lower elasticity than the circumference surface holding member 58. The end surface holding member 60 is formed in a disk shape covering the whole of the end surface of the molded adsorbent 34.

The circumference surface holding member 58 is formed in a ring shape. The circumference surface holding member 58 is configured to have an L-shape cross section and includes a primary holding portion 58a for engaging with the outer circumference surface of the molded adsorbent 34 and a secondary holding portion 58b for keeping the end surface holding member 60 in contact with the end surface of the molded adsorbent 34. A lip sealing portion 61 with a tapered cylindrical shape is formed on a free end portion (a lower end portion in FIG. 14) of the primary holding member 58a. The lip sealing portion 61 is formed in a lip shape gradually increasing its outer diameter in the opposite direction to the insertion direction of the molded adsorbent 34. Thus, the outer diameter of the lip sealing portion 61 increases forwardly in FIG. 11 or rearwardly in FIG. 14.

The circumference surface holding members 58 of the first holding member 55 and the second holding member 56 are disposed symmetrically with respect to the molded adsorbent 34. In addition, a lip seal portion 61 of the circumference surface holding member 58 of the second holding member 56 is formed in a tapered shape and extends from an outer circumference surface of the circumference surface holding member 58 such that an outer diameter of the lip sealing portion 61 gradually increases forwardly in FIG. 12 or in the opposite direction to the insertion direction of the molded adsorbent 34.

Prior to the insertion of the molded adsorbent 34 into the cylindrical tubular portion 27 of the secondary case 16, the first holding member 55 is attached to a first end portion (a rear end portion in FIG. 10) in the insertion direction of the molded adsorbent 34. More specifically, the circumference surface holding member 58 of the first holding member 55 is resiliently fitted with the first end portion (a rear end portion in FIG. 11 or a front end portion in FIG. 14) of the molded adsorbent 34, while the end surface holding member 60 of the first holding member 55 is in surface contact with a first end surface of the molded adsorbent 34 (see FIGS. 11, 13 and 14).

In addition, the second holding member 56 is attached to a second end (a front end in FIG. 10) opposite to the first end of the molded adsorbent 34 such that the first holding member 55 and the second holding member 56 are symmetrically positioned with respect to the molded adsorbent 34. More specifically, the circumference surface holding member 58 of the second holding member 56 is resiliently fitted with the second end portion (the front end portion in FIG. 12) of the molded adsorbent 34 opposite to the first end portion, while the end surface holding member 60 is in surface contact with a second end surface of the molded adsorbent 34 (refer to FIG. 12).

Figure 11:
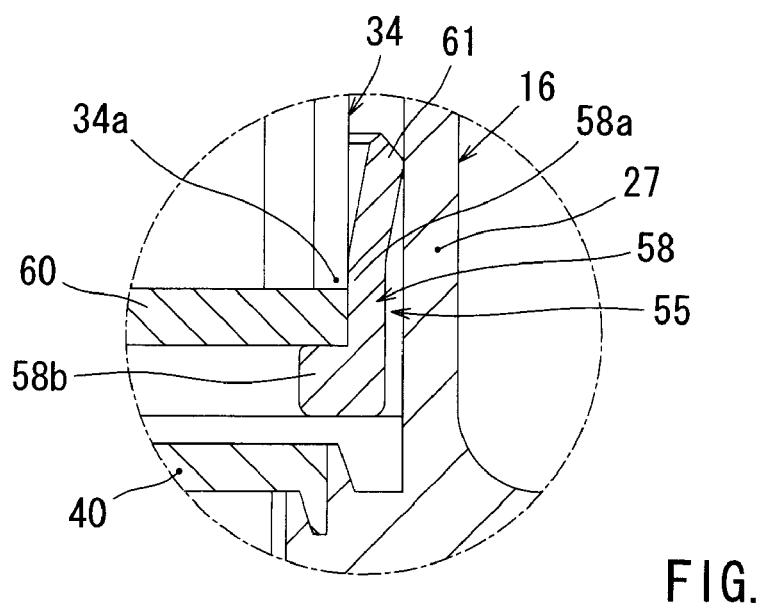
FIG. 11 is an enlarged cross sectional view of portion XI in FIG. 10.
Figure 12:
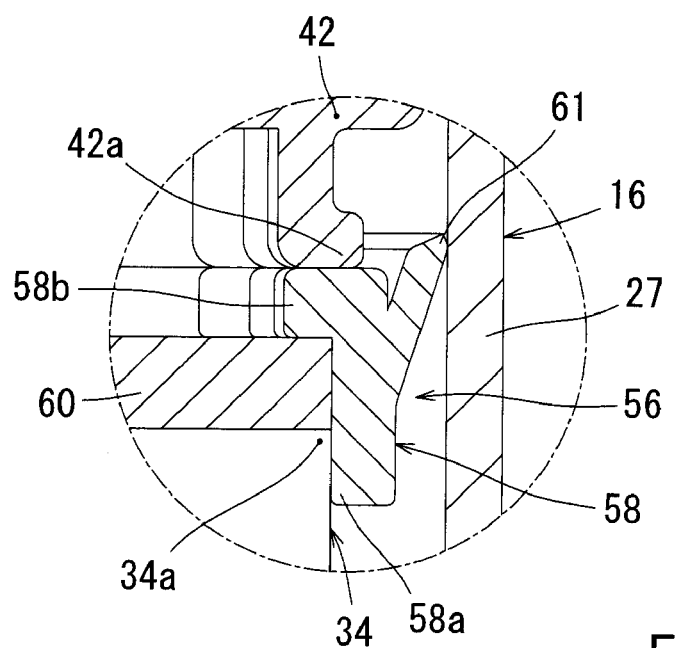
FIG. 12 is an enlarged cross sectional view of portion XII in FIG. 10.

Thereafter, the molded adsorbent 34 having the first and second holding members 55, 56 fitted thereto is inserted into the cylindrical tubular portion 27 of the secondary case 16 before attachment of the lid portion 28. Accordingly, as shown in FIG. 11, a large diameter-side end portion of the lip sealing portion 61 of the first holding member 55 resiliently contacts with the inner surface of the cylindrical tubular portion 27 while a clearance exists between an outer circumference surface of the primary holding portion 58a of the first holding member 55 and the inner surface of the cylindrical tubular portion 27. In addition, as shown in FIG. 12, a large diameter-side end portion of the lip sealing portion 61 of the second holding member 56 resiliently contacts with the inner surface of the cylindrical tubular portion 27 while a clearance exists between an outer circumferential surface of the primary holding portion 58a of the circumference surface holding member 58 of the second holding member 56 and the inner surface of the cylindrical tubular portion 27. Therefore, the molded adsorbent 34 is resiliently held within the cylindrical tubular portion 27 by the first and second holding members 55 and 56. A space defined between the cylindrical tubular portion 27 and the molded adsorbent 34 is elastically sealed with the circumference surface holding members 58 of the holding members 55 and 56. The secondary holding portion 58b of the circumference surface holding member 58 of the first holding member 55 is close to or in contact with the filter 40 (refer to FIG. 11). The pressing portion 42a of the pressing member 42 bears against the secondary holding portion 58b of the circumference holding member 58 of the second holding member 56 (refer to FIG. 12).

In accordance with the vaporized fuel treatment apparatus 10 of this embodiment, the circumference surface holding members 58 of the first and second holding members 55 and 56 contact with the outer circumference surface of the molded adsorbent 34, and the end surface holding members 60 of the first and second holding members 55 and 56 contact with the opposite end surfaces of the molded adsorbent 34, and thus the molded adsorbent 34 can be resiliently held within the case assembly 12 (in particular, within the secondary case 16). Since the end surface holding members 60 have lower elasticity than the circumference surface holding members 58, it is possible to reduce a force that may be applied to the shoulder portion 34a of the molded adsorbent 34. Therefore, potential damage of the shoulder portion 34a of the molded adsorbent 34 due to the forces applied by the holding members 55 and 56 can be prevented or reduced.

The end surface holding members 60 have gas permeability and cover the entire end surfaces of the molded adsorbent 34. Accordingly, the end surface holding members 60 can ensure flow of the gas into or out of the molded adsorbent 34 while protecting the entire end surfaces of the molded adsorbent 34. In addition, since the end surface holding members 60 are opposed to the entire end surfaces of the molded adsorbent 34, decrease of adsorption ability of the molded adsorbent 34, which may be caused in the case that gas impermeable elements are opposed to the end surfaces of the molded adsorbent 34, can be prevented.

Figure 15:
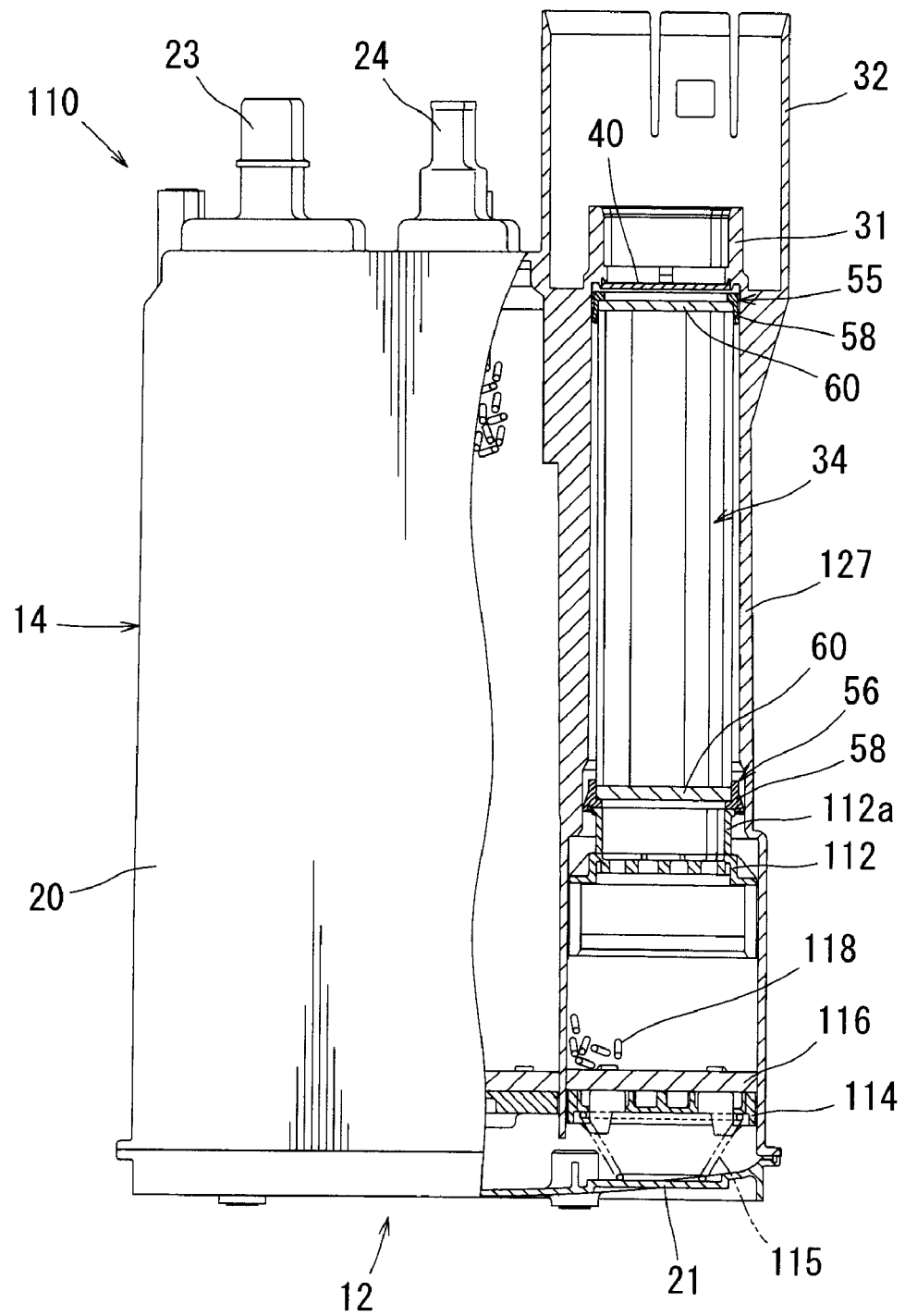
FIG. 15 is a plane view partly in section of a vaporized fuel treatment apparatus according to the fifth embodiment.

A fifth embodiment will now be described with reference to FIG. 15. This embodiment is a modification of the second embodiment. According to this embodiment, the first holding member 37 of the second embodiment (refer to FIG. 7) is replaced with the first holding member 55 of the fourth embodiment, and the second holding member 38 of the second embodiment is replaced with the second holding member 56 of the fourth embodiment.

Figure 16:
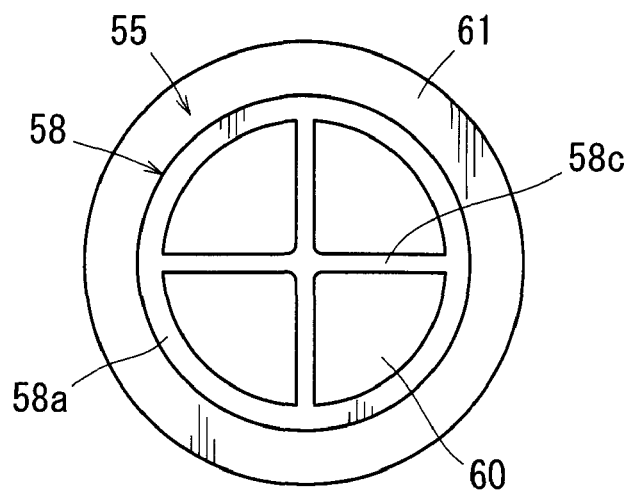
FIG. 16 is an end view of a molded adsorbent provided with a first holding member of according to the sixth embodiment.
Figure 17:
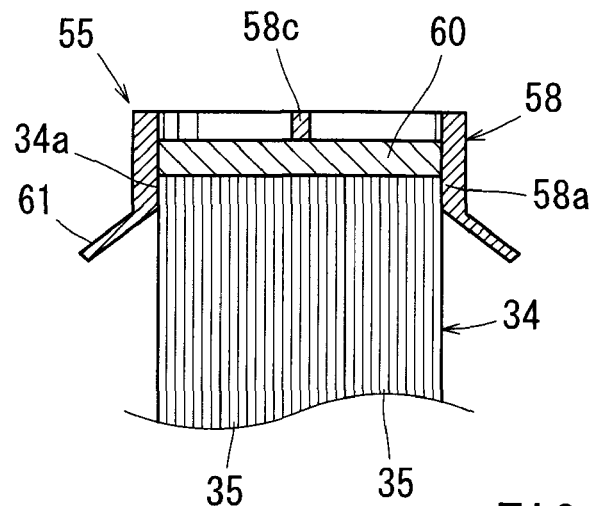
FIG. 17 is a side cross sectional view of a main portion of the molded adsorbent provided with the first holding member.

A sixth embodiment will now be described with reference to FIGS. 16 and 17. This embodiment is a modification of the fourth embodiment. In accordance with the sixth embodiment, the secondary holding portion 58b of the circumference surface holding member 58 of the first holding member 55 in the fourth embodiment (refer to FIGS. 13 and 14) is modified as a secondary holding portion 58c with a cross-shape rib form. It is possible to reinforce the primary holding portion 58a by providing the rib shaped secondary holding portion 58c in the primary holding portion 58a of the circumference surface holding member 58. The rib shaped secondary holding portion 58c may be modified to have various shapes, such as a straight form, a three spoke form, and a mesh-like form as long as it can reinforce the primary holding portion 58a of the circumference holding member 58. The rib shaped secondary holding portion 58c can be applied also to the circumference surface supporting member 58 of the second holding member 56.

A seventh embodiment will now be described with reference to FIGS. 18-24. The seventh embodiment is a modification of the first embodiment. In accordance with the seventh embodiment, the holding structure for the molded adsorbent 34 in the first embodiment is modified. For the purpose of explanation, a holding member 65 and a holding member 66 disposed on the rear side and the front side in FIG. 18 will be referred to as a first holding member 65 and a second holding member 66, respectively. In this embodiment, the pressing member 42 and the pressing spring 43 in the secondary case 16 of the first embodiment (refer to FIG. 1) are omitted. The cylindrical tubular portion 27 of the secondary case 16 is modified to have a stepped cylindrical shape having front and rear stepped portions. Accordingly, the cylindrical tubular portion 27 has a first stepped portion 68 opposed to the first end portion (the rear end portion) of the molded adsorbent 34 in the insertion direction, and a second stepped portion 69 opposed to the second end portion (the front end portion) opposite to the first end portion of the molded adsorbent 34.

Figure 19:
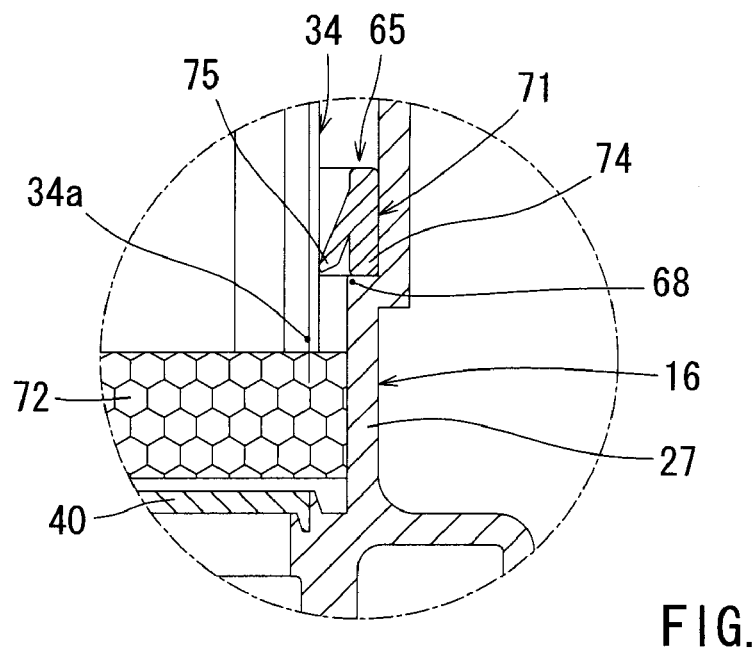
FIG. 19 is an enlarged cross sectional view of portion XIX in FIG. 18.

As shown in FIG. 19, the first holding member 65 has a circumferential surface holding member 71 for engaging with the outer circumferential surface of the molded adsorbent 34 and an end surface holding member 72 for engaging with the first end surface of the molded adsorbent 34. The circumferential surface holding member 71 and the end surface holding member 72 are separate elements from each other. The circumference surface holding member 71 is made from a gas impermeable elastic material.

The end surface holding member 72 is formed from a gas permeable elastic material, such as urethane foam, and has lower elasticity than the circumference surface holding member 71. The end surface holding member 72 is formed in a disk shape, and is fitted within the cylindrical tubular portion 27, in particular, within a cylindrical portion on the rear side (the smaller diameter side) of the first stepped portion 68. The end surface holding member 72 is close to or in contact with the filter 40. In addition, the first end surface of the molded adsorbent 34 is in surface contact with the end surface holding member 72.

Figure 21:
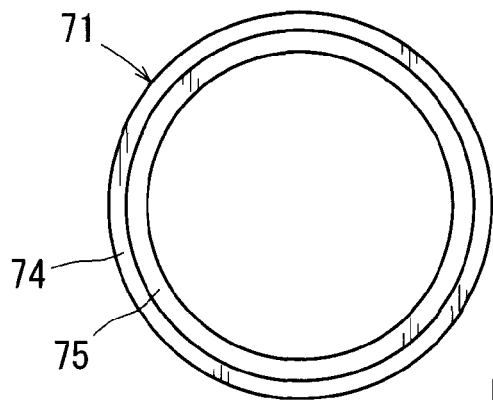
FIG. 21 is a plane view of a circumference surface holding member of a first holding member.
Figure 22:
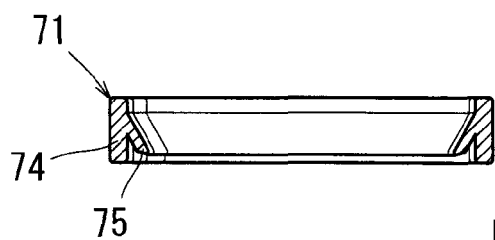
FIG. 22 is a side cross sectional view of the circumference surface holding member of the first holding member.

As shown in FIGS. 21 and 22, the circumference surface holding member 71 is formed in a ring shape. The circumference surface holding member 71 has a hollow cylindrical attachment base 74 and a tapered cylindrical lip sealing portion 75 formed on an inner circumference surface of the attachment base 74. As shown in FIG. 19, the attachment base 74 is elastically fitted within the cylindrical tubular portion 27, in particular, within a cylindrical portion on the front side (the larger diameter side) of the first stepped portion 68. A ring-shape space is defined between the attachment base 74 and the outer circumferential surface of the molded adsorbent 34. The lip sealing portion 75 is formed in a lip shape and has an inner diameter that gradually decreases in a rearward direction, so that the lip sealing portion 75 can elastically contact with the outer circumferential surface of the first end portion of the molded adsorbent 34.

Figure 20:
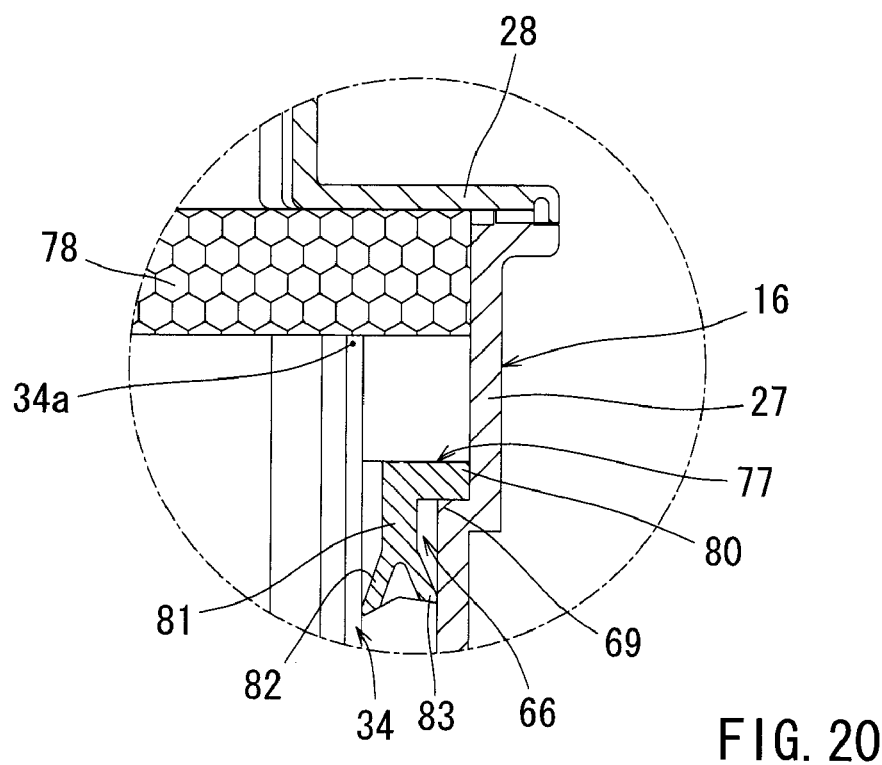
FIG. 20 is an enlarged cross sectional view of portion XX in FIG. 18.

Next, the second holding member 66 will be described. As shown in FIG. 20, the second holding member 66 has a circumference surface holding member 77 for engaging with the outer circumferential surface of the molded adsorbent 34, and an end surface holding member 78 for engaging with a second end surface of the molded adsorbent 34. The circumference surface holding member 77 and the end surface holding member 78 are separate members from each other. The circumference surface holding member 77 is made from an air impermeable elastic material.

The end surface holding member 78 is made from a gas permeable elastic material, such as urethane foam, and has lower elasticity than the circumference surface holding member 77. In addition, the end surface holding member 78 is formed in a disk shape, and is fitted within the cylindrical tubular portion 27 (more specifically, a cylindrical portion on a front side (or a larger diameter side) of the second stepped portion 69). The end surface holding member 78 is in surface contact with the second end surface of the molded adsorbent 34. In addition, an outer circumferential portion of a lid portion 28 is in surface contact with an outer circumferential portion of the end surface holding member 78.

Figure 23:
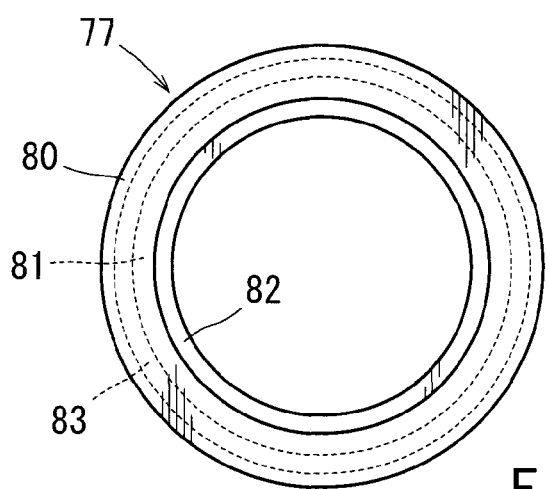
FIG. 23 is a plane view of a circumference surface holding member of a second holding member.
Figure 24:
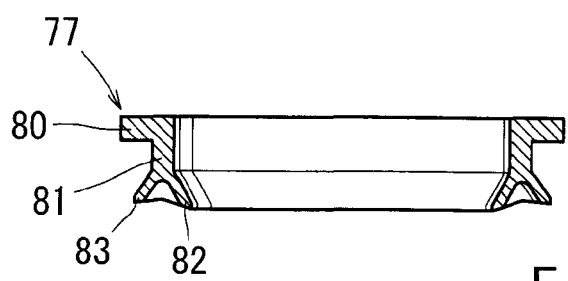
FIG. 24 is a side cross sectional view of the circumference surface holding member of the second holding member.

As shown in FIGS. 23 and 24, the circumference surface holding member 77 is formed in a ring shape. The circumference surface holding member 77 has an attachment base 80 having an annular plate shape, an cylindrical tubular portion 81 protruding rearwardly from an inner circumferential portion of the attachment base 80 and having an L-shape cross section, and a pair of inner and outer lip sealing portions 82 and 83 with cylindrical shapes tapered toward opposite directions to each other and bifurcating from a rear end portion of the cylindrical tubular portion 81. As shown in FIG. 20, the attachment base 80 is resiliently fitted within the cylindrical tubular portion 27 (in particular, the cylindrical portion on the front side (or the larger diameter side) of the second stepped portion 69) and bears against the stepped portion 69. A ring shaped space is defined between an inner circumferential surface of the cylindrical tubular portion 81 and the outer circumferential surface of the molded adsorbent 34, and also a ring shaped space is defined between an outer circumferential surface of the cylindrical tubular portion 81 and the inner surface of the cylindrical tubular portion 27 (in particular, the cylindrical tubular portion on the rear side (or the smaller diameter side) of the second stepped portion 69). The inner lip sealing portion 82 is formed in a lip shape having an inner diameter gradually decreasing in the rearward direction, and elastically contacts with the outer circumferential surface of the second end portion of the molded adsorbent 34. Whereas, the outer lip sealing portion 83 is formed in a lip shape having an outer diameter gradually increasing in the rearward direction, and elastically contacts with the inner circumference surface of the cylindrical tubular portion 27 (in particular, the cylindrical tubular portion on the rear side (or the smaller diameter side) of the second stepped portion 69).

In accordance with the above vaporized fuel treatment apparatus 10, the circumference surface holding members 71 and 77 (in particular, the lip sealing portions 75 and 82) of the holding members 65 and 66 engage with the outer circumferential surface of the molded adsorbent 34, and the end surface holding members 72 and 78 of the holding members 65 and 66 engage with the opposite end surfaces of the molded adsorbent 34, thereby elastically holding the molded adsorbent 34 within the case assembly 12 (in particular, the secondary case 16). The circumference surface holding members 71 and 77 are formed separately from the end surface holding members 72 and 78, and the end surface holding members 72 and 78 have lower elasticity than the circumference surface holding members 71 and 77, thereby reducing the external force that may be applied to the shoulder portions 34a of the molded adsorbent 34. Therefore, it is possible to prevent or reduce potential damage to the shoulder portions 34a of the molded adsorbent 34.

The end surface holding members 72 and 78 entirely cover the opposite end surfaces of the molded adsorbent 34, and have gas permeability. Accordingly, the end surface holding members 72 and 78 ensure that the gas can flow into and out of the molded adsorbent 34, while entirely protecting the end surfaces of the molded adsorbent 34. In addition, since the end surface holding members 72 and 78 cover the entire end surfaces of the molded adsorbent 34, decrease of the adsorption ability of the molded adsorbent 34, which may be caused in the case that gas impermeable elements are opposed to the end surfaces of the molded adsorbent 34, can be prevented.

Figure 18:
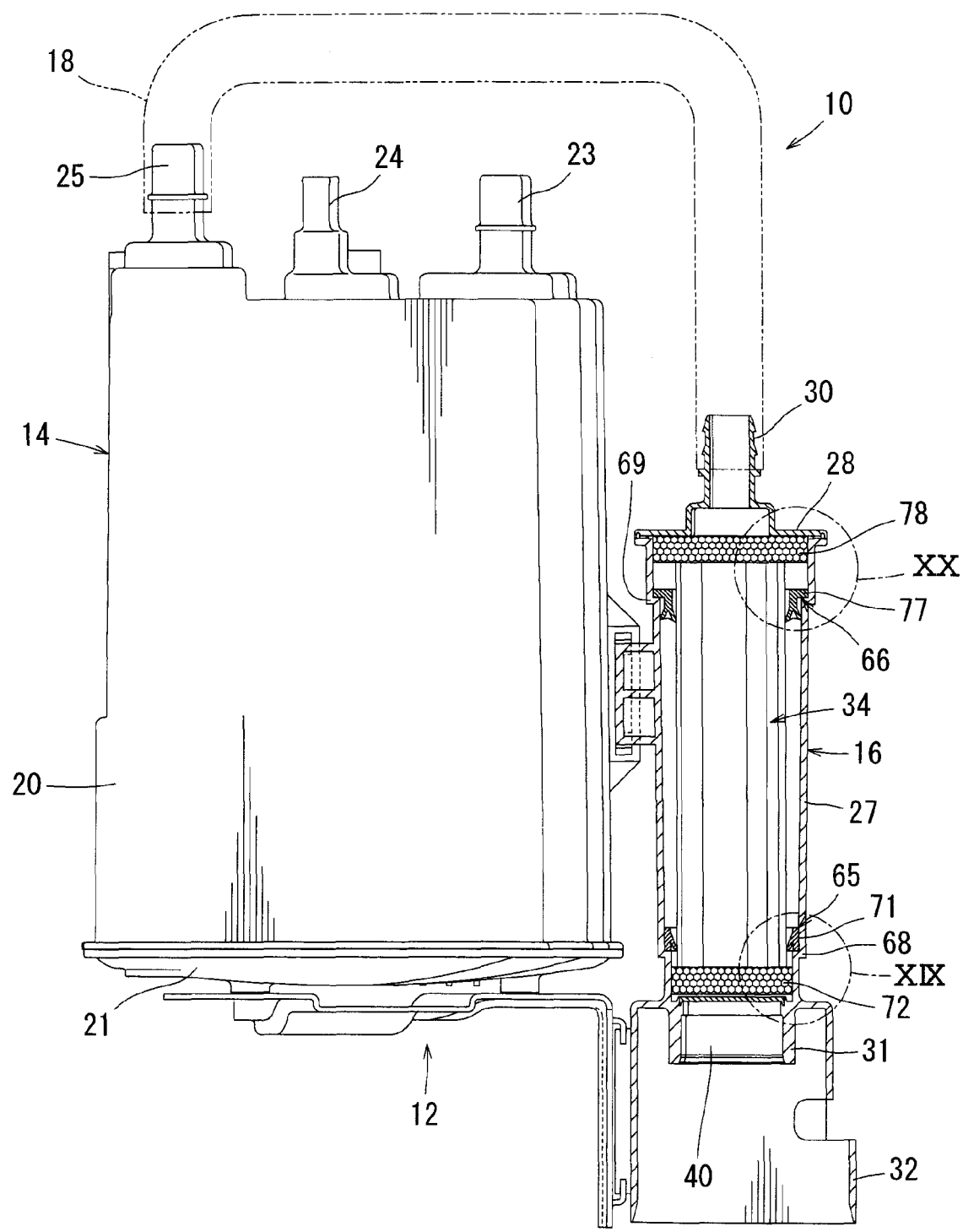
FIG. 18 is a plane view partly in section of a vaporized fuel treatment apparatus according to the seventh embodiment.
Figure 25:
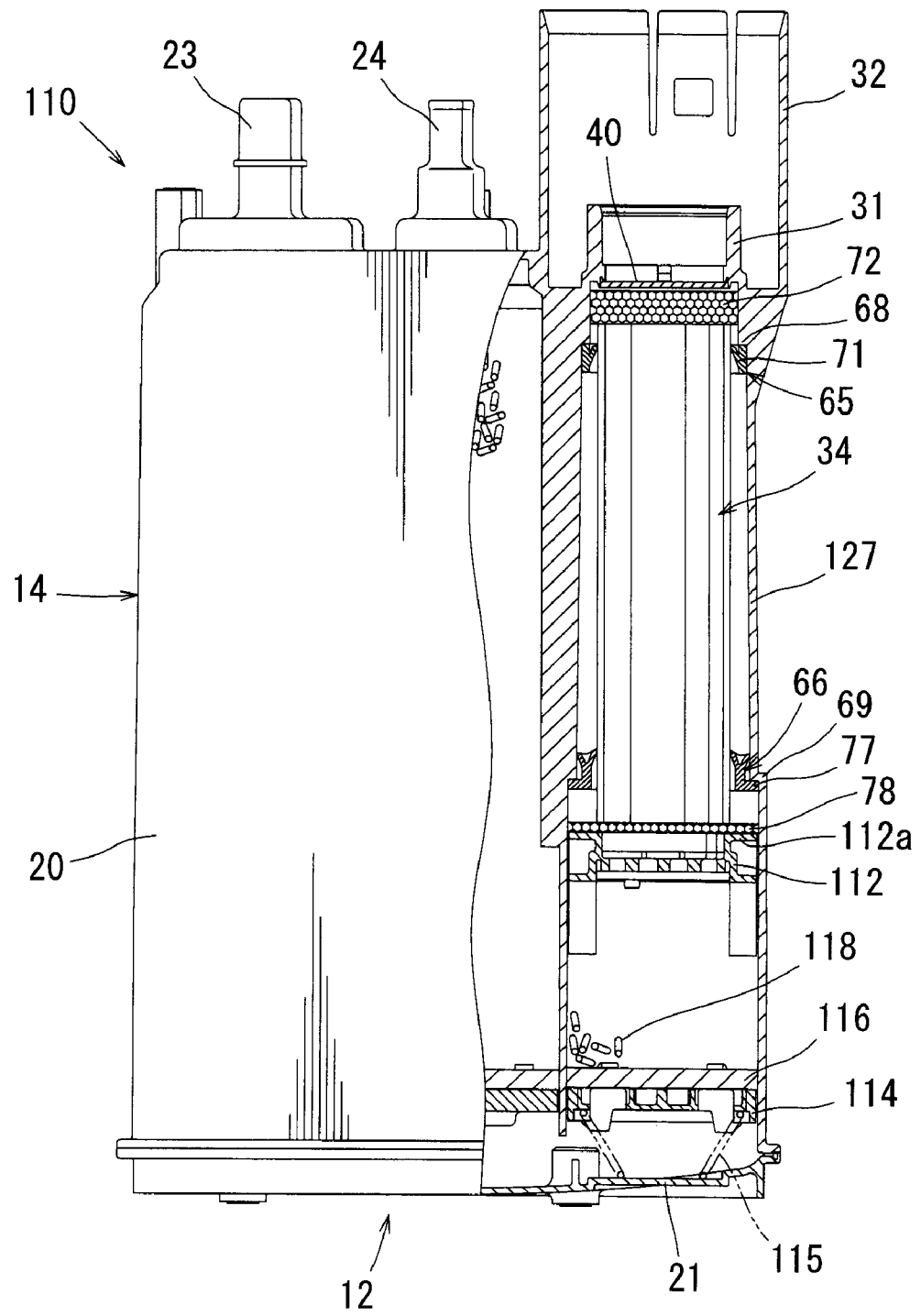
FIG. 25 is a plane view partly in section of a vaporized fuel treatment apparatus according to the eighth embodiment.

An eighth embodiment will now be described with reference to FIG. 18. This embodiment is a modification of the second embodiment. As shown in FIG. 25, according to the vaporized fuel treatment apparatus 110 of this embodiment, the first holding member 37 of the second embodiment (refer to FIG. 7) is replaced with the first holding member 65 of the seventh embodiment (refer to FIG. 18), and the second holding member 38 of the second embodiment (refer to FIG. 7) is replaced with the second holding member 66 of the seventh embodiment. In addition, the cylindrical tubular portion 27 with two stepped cylindrical shape of the seventh embodiment (refer to FIG. 18) is formed with the primary case 14.

Figure 26:
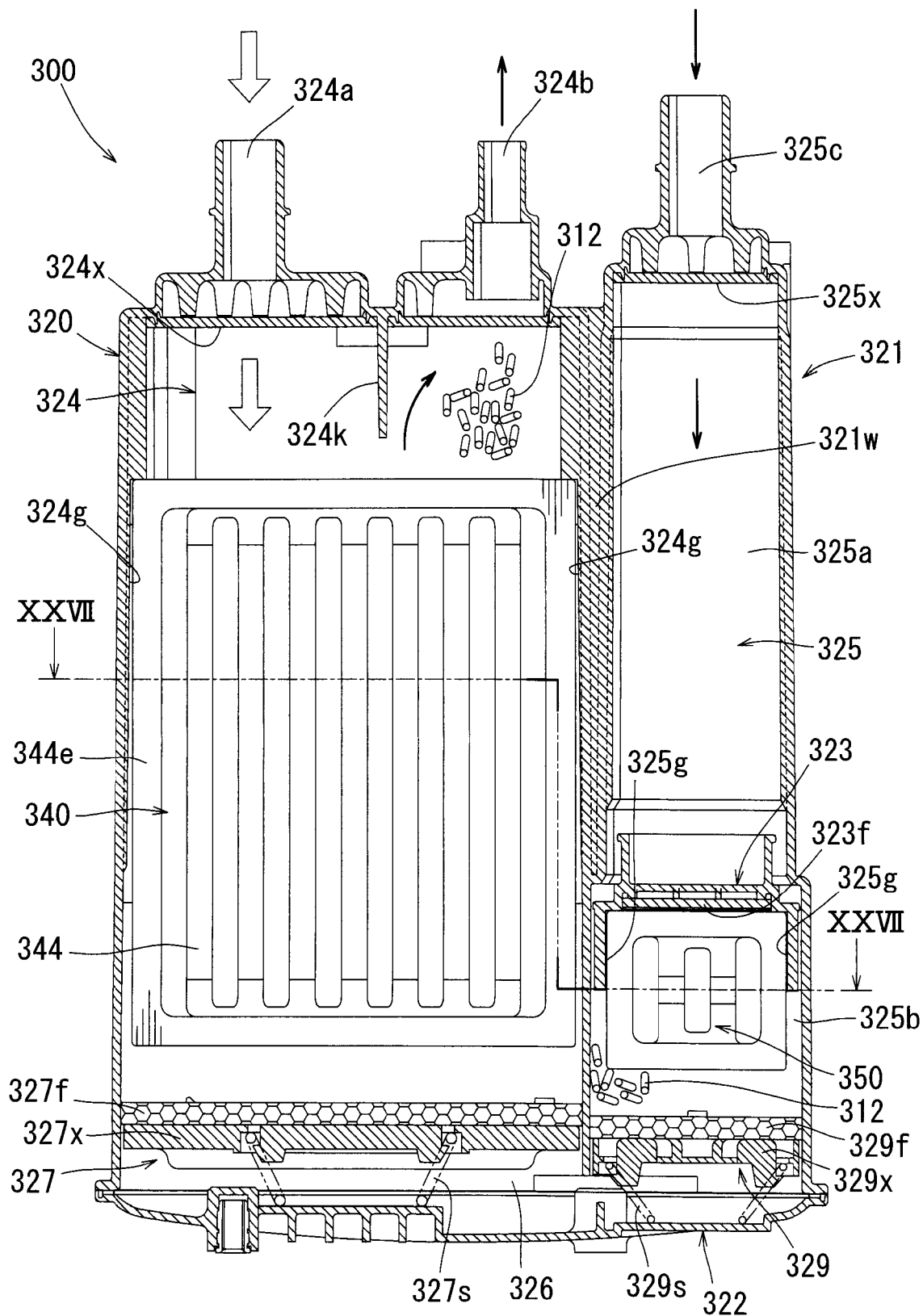
FIG. 26 is a cross sectional view of a canister used in a vaporized fuel treatment apparatus according to the ninth embodiment.
Figure 27:
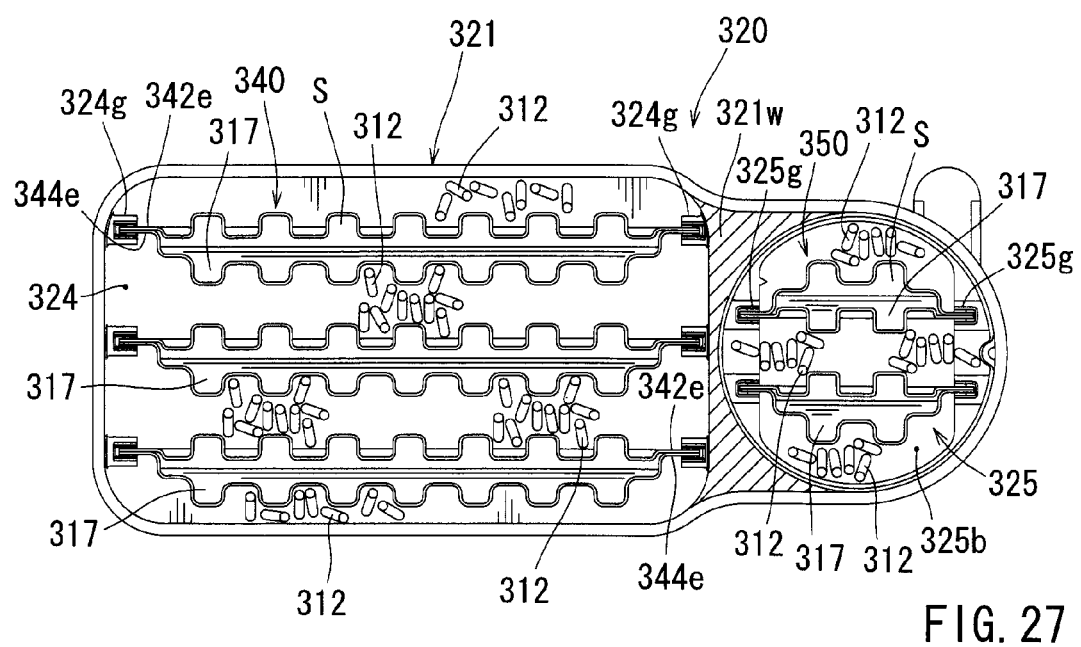
FIG. 27 is a cross sectional view taken along line XXVII-XXVII.

A ninth embodiment will now be described with reference to FIGS. 26-30. As shown in FIGS. 26-30, a vaporized fuel treatment apparatus 300 has a canister 320 filled with an adsorbent 312. As shown in FIGS. 26 and 27, the canister 320 is composed of a case main body 321 divided into a plurality of chambers, and a lid portion 322 for closing a rear opening (positioned on the rear side in FIG. 26) of the case main body 321. An inner space of the case main body 321 is divided into a main chamber 324 with a substantially rectangular horizontal cross section and an auxiliary chamber 325 with a substantially circular horizontal cross section by a partition wall 321w as shown in FIG. 27. In addition, the auxiliary chamber 325 is further divided into a first auxiliary chamber 325a and a second auxiliary chamber 325b by a buffer plate 323 as shown in FIG. 26.

The case main body 321 includes a tank port 324a, a purge port 324b and an atmospheric port 325c arranged in parallel at a front wall portion opposite to the lid portion 322 in FIG. 26. The atmospheric port 325c communicates with the first auxiliary chamber 325a through a perforated plate 325x having a number of small openings. The tank port 324a and the purge port 324b communicate with the main chamber 324 through a perforated plate 324x having a plurality of small openings. A partition wall 324k protruding into the main chamber 324 is formed on the front wall portion of the main chamber 324. The inner space of the main chamber 324 is divided into a first space communicating with the tank port 324a and a second space communicating with the purge port 324b.

With the lid portion 322 removed, a plurality of main sealed containers 340 each containing a heat storage material 317 therein described below are inserted into the main chamber 324 of the case main body 321 such that the main sealed containers 340 are spaced away from each other in the vertical direction as shown in FIG. 27. In this embodiment, three main sealed containers 340 are provided. Then, the spaces defined between the main sealed containers 340 and the spaces defined between the main sealed containers 340 positioned on opposite sides and an inner wall surface of the main chamber 324 are filled with the adsorbent 312.

The adsorbent 312 is composed of an activated carbon or the like capable of adsorbing the vapor and also capable of desorbing the vapor when purged by air. The openings of the perforated plate 324x are designed to be much smaller than the particle size of the adsorbent 312 in order to keep the adsorbent 312 within the main chamber 324.

After mounting the main sealed containers 340 within the main chamber 324 of the case main body 321 and introducing the adsorbent 312 thereinto, the opening of the main chamber 324 is closed by an inner lid plate 327 as shown in FIG. 26. The inner lid plate 327 is a gas permeable plate and is composed of a first filter 327f and a perforated plate 327x. The inner lid plate 327 serves to hold the adsorbent 312 within the main chamber 324. The inner lid plate 327 can slide in the horizontal direction along the inner wall surface of the main chamber 324 while closing the opening of the main chamber 324. A coil spring 327s has one end fitted into a center portion of a rear surface of the inner lid plate 327. When the opening of the case main body 321 is closed by the lid portion 322, the other end of the coil spring 327s is pressed by an inner surface of the lid portion 322. Thus, the inner lid plate 327 is pressed inwardly (forwardly in FIG. 26) into the main chamber 324 by the coil spring 327s. As a result, unnecessarily large spaces may not be produced between particles of the adsorbent 312, and thus the resistance of the adsorbent 312 against flow of gas can be kept at a constant level.

As described above, the auxiliary chamber 325 of the case main body 321 is divided into the first auxiliary chamber 325a and the second auxiliary chamber 325b by the buffer plate 323, and a second filter 323f is positioned to be opposed to the rear surface of the buffer plate 323 facing the second auxiliary chamber 325b.

With the lid portion 322 removed, a plurality of auxiliary sealed containers 350 each filled with a heat storage material 317 are inserted into the second auxiliary chamber 325b of the case main body 321 such that the auxiliary sealed containers 350 are spaced away from each other in the vertical direction as shown in FIG. 27. In this embodiment, two auxiliary sealed containers 350 are provided. Then, the adsorbent 312 is filled into each of the spaces between the auxiliary sealed containers 350 and between each of the auxiliary sealed containers 350 and an inner surface of the second auxiliary chamber 325b.

After inserting the auxiliary sealed containers 350 into the second auxiliary chamber 325 and introducing the adsorbent 312 thereinto, the opening of the second auxiliary chamber 325b is closed by an inner lid plate 329 as shown in FIG. 26.

The inner lid plate 329 is a gas permeable plate and is composed of a third filter 329f and a perforated plate 329x. The inner lid plate 329 serves to hold the adsorbent 312 within the second auxiliary chamber 325b.

The inner lid plate 329 can slide in the horizontal direction along the inner surface of the second auxiliary chamber 325b while closing the opening of the second auxiliary chamber 325b. A coil spring 329s has one end fitted into a center portion of a rear surface of the inner lid plate 329. Accordingly, when the opening of the case main body 321 is closed by the lid portion 322, the inner lid plate 329 is pressed inwardly (forwardly in FIG. 26) into the second auxiliary chamber 325b by the coil spring 329s.

A diffusing space 326 is defined between the lid portion 322 and the inner lid plate 329 for closing the opening of the second auxiliary chamber 325b and between the lid portion 322 and the inner lid plate 327 for closing the opening of the main chamber 324. The diffusing space 326 serves to communicate the main chamber 324 with the second auxiliary chamber 325b.

The heat storage material 317 can reduce alteration in temperature within the canister 320 by using latent heat that may be produced during solidification or melting of the heat storage material 317. For example, hexadecane ($C_{16}H_{34}$) having a melting point of 18° C. may be used as the heat storage material 317. Accordingly, when the temperature within the canister 320 becomes equal to or higher than 18° C., the heat storage material 317 melts and absorbs heat within the canister 320, thereby inhibiting increase in temperature within the canister 320. If the temperature within the canister 320 becomes lower than 18° C., the heat storage material 317 emits heat during solidification, thereby inhibiting further temperature decrease within the canister 320.

Figure 28A:
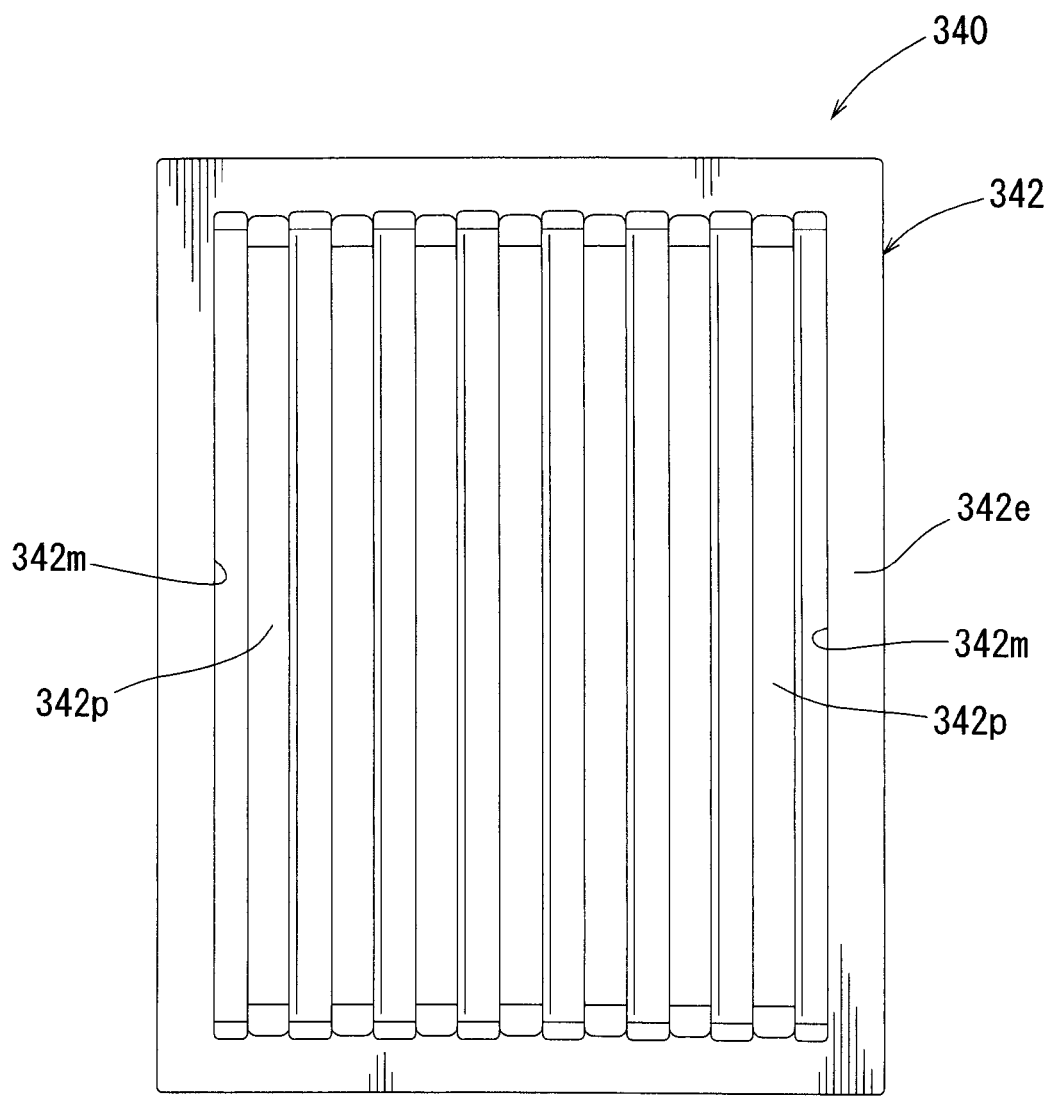
FIG. 28A is a plane view of a main sealed container.
Figure 28B:
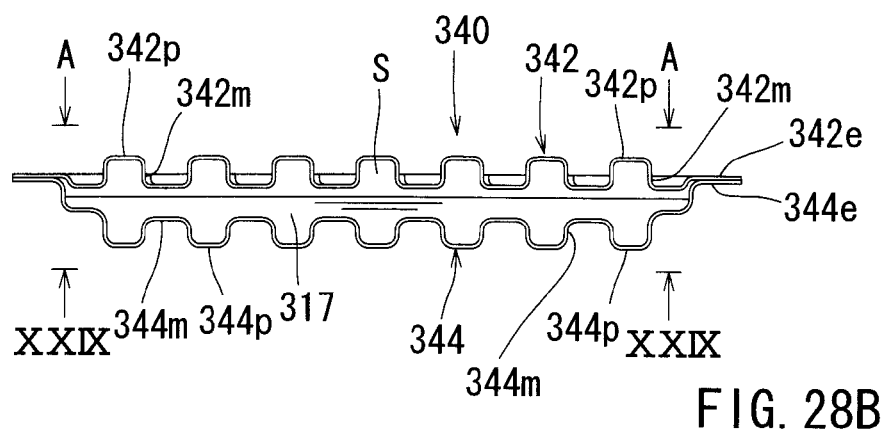
FIG. 28B is a cross sectional view of the main sealed container.
Figure 29:
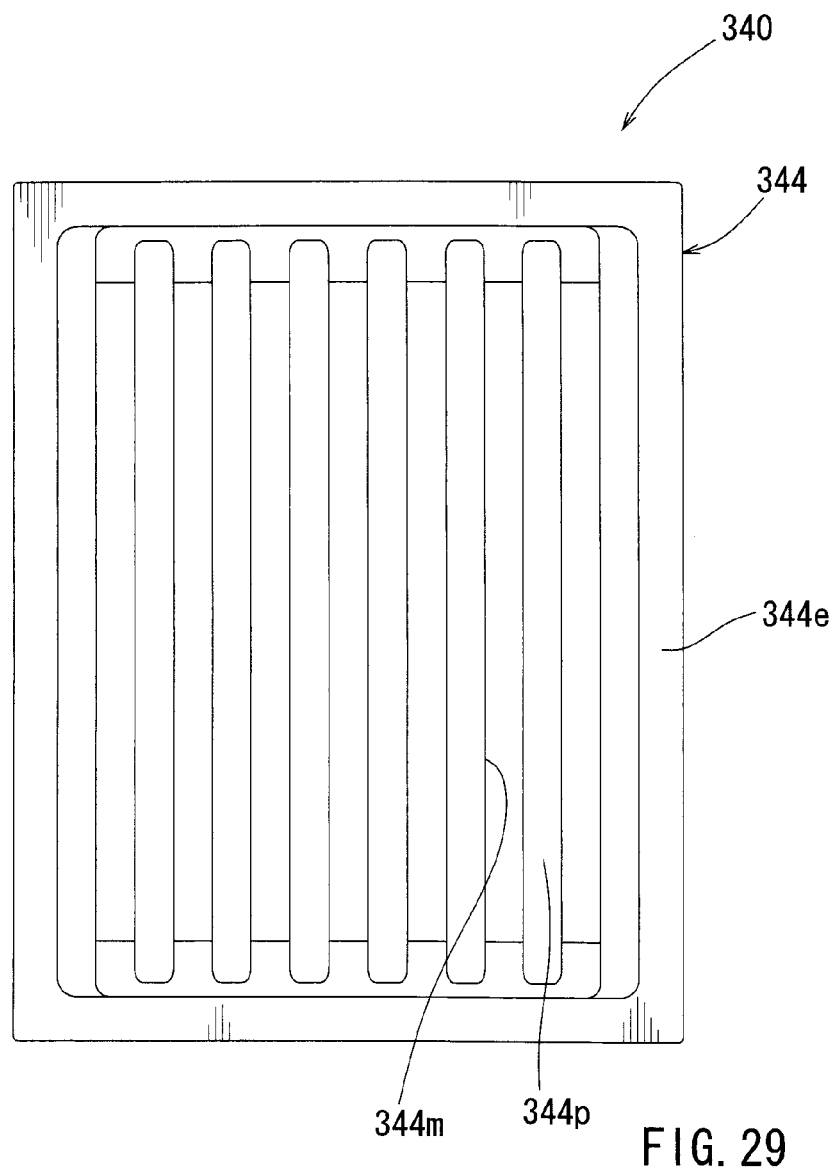
FIG. 29 is a bottom view of the main sealed container.

Each of the main sealed containers 340 containing the heat storage material 317 therein is formed by joining a flange portion 342e of an upper panel 342 with a flange portion 344e of a lower panel 344. The upper panel 342 has a lid-like shape, and the lower panel 344 has a shallow open box-like shape as shown in FIGS. 28A, 28B and 29. For example, the upper panel 342 may be made of a rectangular stainless plate that is formed to have a circumference edge with a uniform width as the flange portion 342e as shown in FIG. 28A. The upper panel 342 has linear groove portions 342m and linear raised portions 342p each extending in a longitudinal direction of the upper panel 342 and having a rectangular cross section. The linear groove portions 342m and the linear raised portions 342p are formed in an area surrounded by the flange portion 342e and have a uniform width. The groove portions 342m and the raised portions 342p are arranged alternately along a widthwise direction of the upper panel 342. In the case that the upper panel 342 is formed by a press molding process of a stainless plate, the raised portions 342p on an upper side of the upper panel 342 may be formed as groove portions as viewed from the lower side, and the groove portions 342m on the upper side of the upper panel 342 may be formed as raised portions as viewed from the lower side (see FIG. 28B).

The lower panel 344 has a rectangular shallow box shape and may be formed from a stainless plate to have a circumference edge that has a uniform width as the flange portion 344e. The lower panel 344 has linear groove portions 344m and linear raised portions 344p each extending in a longitudinal direction of the lower panel 344 and having a rectangular cross section. The linear groove portions 344m and the linear raised portions 344p are formed in an area surrounded by the flange portion 344e and have a uniform width. The groove portions 344m and the raised portions 344p are arranged alternately along a widthwise direction of the lower panel 344. Similar to the upper panel 342, the lower panel 344 may be formed by a press molding process of a stainless plate. In such a case, the raised portions 344p on the lower side of the lower panel 344 (the outer side of the main sealed container 340, refer to FIG. 29) may be formed as groove portions as viewed from the upper side (the inner side of the main sealed container 340), and the groove portions 344m on the lower side may be formed as raised portions as viewed from the upper side (see FIG. 28B).

The width and the length of the lower panel 344 is set to be equal to the width and the length of the upper panel 342, and the width of the groove portions 344m and the raised portions 344p of the lower panel 344 are set to be equal to the width of the groove portions 342m and the raised portions 342p of the upper panel 342.

With the heat storage material 317 filled within the main sealed container 340, the flange portion 344e of the lower panel 344 and the flange portion 342e of the upper panel 342 are joined to each other, for example, by laser welding, as shown in FIG. 28B. A space S defined within the main sealed container 340 is filled with helium gas.

As shown in FIG. 27, opposite edges in the widthwise direction of the flange portions 342e and 344e of each of the main sealed containers 340 engage with corresponding one of three pairs of rail-shape grooves 324g formed on opposite sides in the widthwise direction of an inner surface of the main chamber 324 of the canister 320. Accordingly, the main sealed containers 340 are mounted within the main chamber 324 in substantially horizontal manner. The three pairs of the rail-shape grooves 324g are arranged at the same intervals in the vertical direction.

Figure 30A:
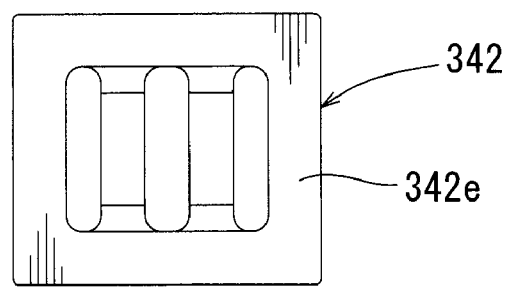
FIG. 30A is a plane view of an auxiliary sealed container.
Figure 30B:
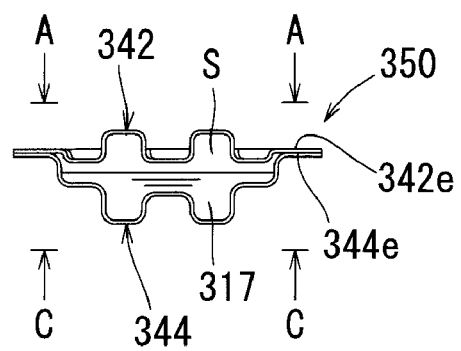
FIG. 30B is a cross sectional view of the auxiliary sealed container.
Figure 30C:
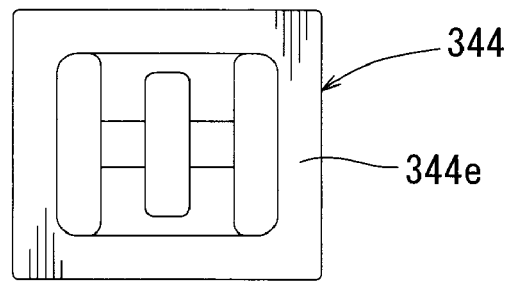
FIG. 30C is a bottom view of the auxiliary sealed container.
Figure 31:
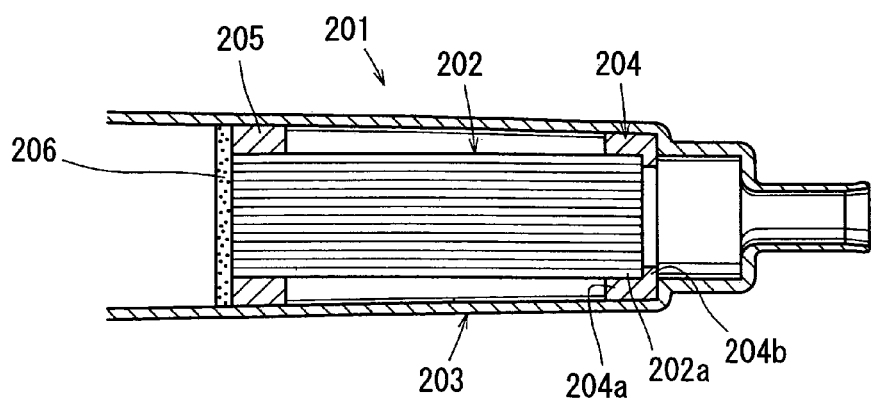
FIG. 31 is a cross sectional view of a known vaporized fuel treatment apparatus.

Similar to the main sealed containers 340, each of the auxiliary sealed containers 350 contains the heat storage material 317 and has the substantially same structure as the main sealed container 340. However, the size of the auxiliary sealed container 350 is smaller than the size of the main sealed container 340 as shown in FIGS. 30A, 30B and 30C. Therefore, components of the auxiliary sealed container 350 that are the same or similar to the components of the main sealed container 340 are labeled with the same reference numbers, and the description of these components will not be repeated.

As shown in FIG. 27, opposite edges in the widthwise direction of the flange portions 342e and 344e of each auxiliary sealed container 350 engage with corresponding one of two pairs of rail-shape grooves 325g formed in opposite sides in the widthwise direction of an inner surface of the buffer plate 323 disposed within the second auxiliary chamber 325b. Thus, the auxiliary sealed containers 350 are disposed within the second auxiliary chamber 325b in substantially horizontal manner. The two pairs of the rail-shape groove portions 325g are spaced away from each other by a predetermined distance in the vertical direction as viewed in FIG. 27.

When a vehicle engine (not shown) is stopped, vapor contained in fuel evaporation gas that may be generated in a fuel tank (not shown) can be introduced into the main chamber 324 from the tank port 324a of the canister 320 through a vaporized fuel pathway (not shown) as indicated by an outline arrow in FIG. 26. Therefore, the vapor may be adsorbed by the adsorbent 312 contained within the main chamber 324. A part of the vapor, which has not been adsorbed by the adsorbent 312 within the main chamber 324, is introduced into the second auxiliary chamber 325b through the diffusing space 326. As the adsorbent 312 adsorbs the vapor, the temperature of the adsorbent 312 gradually increases and thus the adsorptive ability of the adsorbent 312 gradually decreases. However, each of the main sealed containers 340 and the auxiliary sealed containers 350 disposed within the canister 320 contains the heat storage material 317 (e.g., hexadecane). Therefore, when the temperature within the canister 320 exceeds 18° C., the heat storage material 317 can melt and absorb heat within the canister 320, thereby inhibiting temperature increase within the canister 320. Accordingly, it is possible to prevent the adsorptive ability of the adsorbent 312 from being lowered.

As the heat storage material 317 melts, the volume of the heat storage material 317 may increase. However, each of the main sealed containers 340 and the auxiliary sealed containers 350 has the space S, and thus the volume increase of the heat storage material 317 can be compensated by the compression of the helium gas contained within the space S. Therefore, no excess force may be applied to the main sealed containers 340 and the auxiliary sealed containers 350.

During the operation of the vehicle engine, a negative pressure produced within an intake air pathway (not shown) may be introduced into the purge port 324b of the canister 320 via a purge pathway (not shown) and further into the main chamber 324, the diffusing space 326, the second auxiliary chamber 325b and the first auxiliary chamber 325a. Therefore, as indicated by bold arrows in FIG. 26, the ambient air may flow into the first auxiliary chamber 325a of the canister 320 through the ambient port 325c and further into the intake air pathway through the second auxiliary chamber 325b, the diffusing space 326, the main chamber 324, the purge port 324b and the purge pathway. As a result, the vapor adsorbed by the adsorbent 312 within the canister 320 can be desorbed, and can be introduced into the intake air pathway along with the flow of air.

As the vapor adsorbed by the adsorbent 312 is desorbed by the purging operation, the temperature of the adsorbent 312 decreases to gradually lower the desorptive ability for the vapor. However, when the temperature in the canister 320 has become equal to or lower than 18° C., the heat storage material 317 emits heat during solidification, thereby inhibiting temperature decrease within the canister 320. Accordingly, it is possible to inhibit decrease in the desorptive efficiency of the adsorbent 312 for the vapor.

In accordance with the vaporized fuel treatment apparatus 300 of the present embodiment, each of the sealed containers 340 and 350 has the space S that is capable of compensating the volume increase of the heat storage material 317 and is defined between the inner surface of each of the sealed containers 340 and 350 and the surface of the heat storage material 317. Thus, in the case that the volume of the heat storage material 317 has increased during melting of the heat storage material 317, such increase in volume can be compensated by the compression of the gas contained within the corresponding space S, and thus no excess stress may be applied to the sealed containers 340 and 350.

In addition, the groove portions 344m and the raised portions 344p formed on the outer surface of each of the sealed containers 340 and 350 may increase the heat exchange efficiency between the corresponding heat storage material 317 and the adsorbent 312 contained within the canister 320.

Furthermore, the groove portions 344m and the raised portions 344p are formed on the inner surface of each of the sealed containers 340 and 350, and therefore, even in the case that the sealed containers 340 and 350 each containing the heat storage material 317 in liquid phase have been tilted, the heat storage material 317 can be prevented from concentrating in one end of each of the sealed containers 340 and 350.

The sealed containers 340 and 350 are each formed to have a flattened shape, and disposed within the canister 320 in substantially horizontal manner. The lower panel 344 of each of the sealed containers 340 and 350 has a surface area larger than that of the upper panel 342. The lower panel 344 has a contact area, with which the heat storage material 317 in liquid phase contacts, larger than that of the upper panel 342, thereby increasing the heat exchange efficiency.

Since each of the spaces S defined within the sealed containers 340 and 350 is filled with inert gas such as helium gas, it is possible to prevent potential deterioration of the heat storage material 317. In addition, it is possible to check the sealed condition of the sealed containers 340 and 350 by detecting leakage of the inert gas.

The plurality of the sealed containers 340 and 350 are disposed in the canister 320 and the second auxiliary chamber 325b, respectively. Therefore, although the heat exchange efficiencies of the upper panel 342 and the lower panel 344 are different from each other, since most of the adsorbent 312 are placed close to the lower panel 344 having higher heat exchange efficiency, the adsorbent 312 in this embodiment can more efficiently carry out heat exchange with the heat storage material 317 in the sealed containers 340 and 350 than the case that each one of the sealed containers 340 and 350 is disposed in the canister 320 and the second auxiliary chamber 325b, respectively.

The above embodiment can be modified in various ways. For example, although hexadecane having a melting point of 18° C. was exemplified as the heat storage material 317, the material for the heat storage material 317 can be changed depending on a necessary or desired control temperature within the canister 320. For example, heptadecane ($C_{17}H_{36}$) having a melting point of 22° C. or any other suitable materials can be used.

In addition, although each of the sealed containers 340 and 350 has the groove portions 344m and the raised portions 344p, the groove portions 344m and the raised portions 344p may be replaced with any other depressions and projections as long as they form a concave-convex structure. Furthermore, it is possible to form fins or the like on the surfaces of the sealed containers 340 and 350.

Although the sealed container 340 and 350 each having a flattened box shape were exemplified, these sealed containers may have any other suitable shapes.

Although the helium gas was exemplified as the inert gas contained within the sealed containers 40 and 50, argon gas, nitrogen or the like can be used instead of the helium gas.

The above embodiments can be combined with each other. For example, the vaporized fuel treatment apparatus 110 in the second embodiment can additionally have the main sealed containers 340 and the auxiliary sealed containers 350 filled with the heat storage material 317 and the inert gas in the ninth embodiment. In particular, the whole structures of the vaporized fuel treatment apparatuses 110 and 300 in the second and ninth embodiments are similar to each other. One of major differences between the vaporized fuel treatment apparatuses 110 and 300 is that the vaporized fuel treatment apparatus 300 includes the main sealed containers 340 and the rail-shape grooves 324g in the main chamber 324 and the auxiliary sealed containers 350 and the rail-shaped grooves 325g in the second auxiliary chamber 325b. The main sealed containers 340 and the auxiliary sealed containers 350 are filled with the heat storage material 317 and the inert gas, such as helium gas. In addition, the main chamber 324 including the main sealed containers 340 and the second auxiliary chamber 325b including the auxiliary sealed containers 350 are filled with the adsorbent 312. Whereas the case main body 20 and a rear half of the cylindrical tubular portion 127, which correspond to the main chamber 324 and the second auxiliary chamber 325b, respectively, of the second embodiment are merely filled with the particle adsorbent. With respect to the other major differences between the vaporized fuel treatment apparatuses 110 and 300, the vaporized fuel treatment apparatus 110 has the molded adsorbent 34, the first and second holding members 37 and 38 in the cylindrical tubular portion 127 for elastically holding the molded adsorbent 34. Accordingly, the vaporized fuel treatment apparatus 110 having the molded adsorbent 34, the first and second holding members 37 and 38 can additionally include the main sealed containers 340 and the rail-shaped grooves 324g in the case main body 20 and the auxiliary sealed containers 350 and the rail-shaped grooves 325g in the rear half of the cylindrical tubular portion 127. In the same way, other vaporized fuel treatment apparatuses described above such as the vaporized fuel treatment apparatus 10 of the first embodiment can include the main and auxiliary sealed containers 340 and 350 filled with the heat storage material 317 and the inert gas and the rail shaped grooves 324g and 325g for holding the sealed containers 340 and 350 in the main case body 20 and the cylindrical tubular portion 27 and 127.

The invention claimed is:

1. A vaporized fuel treatment apparatus comprising,
a first adsorbent having a honeycomb structure capable of adsorbing vapor contained in fuel evaporation gas;
a case configured to house the first adsorbent therein; and
a holding device configured to elastically hold the first adsorbent within the case,
wherein the first adsorbent has a circumferential surface and at least one end surface intersecting with the circumferential surface at a corner portion;
wherein the holding device comprises a holding member having a first portion and a second portion configured to contact with the circumferential surface and the at least one end surface, respectively; and
wherein the holding member does not contact with the corner portion of the first adsorbent.

2. The vaporized fuel treatment apparatus according to claim 1, further comprising,
a canister filled with a second adsorbent capable of adsorbing the vapor;
a heat storage material capable of inhibiting alteration in temperature within the canister by producing latent heat when the heat storage material is solidified or melted; and
a sealed container containing the heat storage material therein and disposed within the canister,
wherein the sealed container contains a gas capable of compensating potential increase in volume of the heat storage material.

3. The vaporized fuel treatment apparatus according to claim 2, wherein a concave-convex portion is formed on an outer surface of the sealed container.

4. The vaporized fuel treatment apparatus according to claim 3, wherein a concave-convex portion is formed on an inner surface of the sealed container.

5. The vaporized fuel treatment apparatus according to claim 2, wherein the sealed container includes an upper panel with a first circumferential edge portion and a lower panel with a second circumferential edge portion joined to the first circumferential edge portion.

6. The vaporized fuel treatment apparatus according to claim 5, wherein the upper panel has a lid-like shape and the lower panel as a shallow open box shape.

7. The vaporized fuel treatment apparatus according to claim 5, wherein the sealed container is disposed horizontally within the canister.

8. The vaporized fuel treatment apparatus according to claim 5, wherein the lower panel has a surface area that is larger than a surface area of the upper panel.

9. The vaporized fuel treatment apparatus according to claim 2, wherein the gas in the sealed container includes an inert gas.

10. The vaporized fuel treatment apparatus according to claim 5, wherein the canister has a plurality of the sealed containers disposed therein, and the sealed containers are mounted within the canister such that the sealed containers are spaced from each other in a vertical direction.

11. The vaporized fuel treatment apparatus as in claim 1, wherein:
the first and second portions of the holding member are connected to each other via a connecting portion opposed to the corner portion of the first adsorbent;
the connecting portion does not contact with the corner portion.

12. The vaporized fuel treatment apparatus as in claim 11, wherein the connecting portion has a relief recess opposed to the corner portion.

13. The vaporized fuel treatment apparatus as in claim 11, wherein the first holding member is made of an elastically deformable material.

14. A vaporized fuel treatment apparatus comprising,
a molded adsorbent capable of adsorbing vapor;
a case configured to house the molded adsorbent therein; and
a holding device configured to elastically hold the molded adsorbent within the case,
wherein the molded adsorbent has a circumferential surface and at least one end surface;
wherein the holding device comprises a first holding member and a second holding member configured to contact with the circumferential surface and the at least one end surface, respectively;
the second holding member is held in contact with the at least one end surface of the molded adsorbent by the first holding member;
wherein each of the first and second holding members has elasticity;
the elasticity of the second holding member is lower than the elasticity of the first holding member.

15. The vaporized fuel treatment apparatus according to claim 14, wherein each of the first and second holding members is made of an elastically deformable material.

16. The vaporized fuel treatment apparatus according to claim 14,
wherein the second holding member entirely covers the end surface of the molded adsorbent and has gas permeability.

17. A vaporized fuel treatment apparatus comprising,
a canister filled with an adsorbent capable of adsorbing vapor;
a heat storage material capable of inhibiting alteration in temperature within the canister by producing latent heat when the heat storage material is solidified or melted; and
a sealed container containing the heat storage material therein and disposed within the canister,
wherein the sealed container includes a gas capable of compensating potential increase in volume of the heat storage material.

* * * * *